(12) United States Patent
Endo et al.

(10) Patent No.: US 6,414,624 B2
(45) Date of Patent: Jul. 2, 2002

(54) ANTENNA APPARATUS FOR USE IN AUTOMOBILES

(75) Inventors: Hiroshi Endo, Tokyo (JP); Richard Langley, Chartham Hatch (GB)

(73) Assignee: Harada Industry Co., Ltd., Tokyo (JP)

(*) Notice: Subject to any disclaimer, the term of this patent is extended or adjusted under 35 U.S.C. 154(b) by 0 days.

(21) Appl. No.: 09/862,088

(22) Filed: May 21, 2001

Related U.S. Application Data

(62) Division of application No. 09/440,176, filed on Nov. 15, 1999.

(30) Foreign Application Priority Data

Nov. 19, 1998 (JP) .............................. 10-329742

(51) Int. Cl.[7] .............................................. G01S 13/93
(52) U.S. Cl. .................... 342/70; 342/89; 342/357.01; 342/357.06; 342/368; 342/371; 342/374
(58) Field of Search ................................ 701/200, 207, 701/208–223; 343/700 MS, 711–717; 342/70, 71, 72, 357.01–357.17, 368–377, 42, 175, 89, 90, 91, 92

(56) References Cited

U.S. PATENT DOCUMENTS

| | | | |
|---|---|---|---|
| 5,349,360 A | | 9/1994 | Matsui |
| 5,724,042 A | * | 3/1998 | Komatsu et al. ............ 342/175 |
| 5,767,803 A | | 6/1998 | Yamada |
| 6,008,750 A | * | 12/1999 | Cottle et al. ................ 342/42 |
| 6,271,798 B1 | * | 8/2001 | Endo et al. .................. 343/713 |

FOREIGN PATENT DOCUMENTS

| | | |
|---|---|---|
| EP | 0 773 452 A1 | 5/1997 |
| EP | 0 806 851 A2 | 11/1997 |
| EP | 0 856 905 A1 | 8/1998 |
| EP | 0 877 440 A1 | 11/1998 |
| EP | 0 899 811 A2 | 3/1999 |
| EP | 0 952 674 A2 | 10/1999 |

* cited by examiner

*Primary Examiner*—Bernarr E. Gregory
(74) *Attorney, Agent, or Firm*—Pennie & Edmonds LLP

(57) ABSTRACT

An automobile antenna apparatus according to the present invention includes an antenna control section for electronically and variably controlling (beam-steering or beam-scanning) an emitting-beam pattern of each of antennas mounted on an automobile, based on high-precision positional information of the automobile, to optimize a function of using an electric wave for vehicle (for broadcast wave reception, mobile communications, positioning, obstruction detection and the like).

3 Claims, 24 Drawing Sheets

FIG. 12A

| 1 2 3 4 5 6 7 8 | 9 10 11 12 13 14 15 16 | 17 18 19 20 21 22 23 24 | 25 26 27 28 29 30 | |
|---|---|---|---|---|
| PREAMBLE<br>0 1 1 0 0 1 1 0 | MESSAGE TYPE<br>(FRAME ID)<br>MSB  LSB | STATION I.D.<br>MSB  LSB | PARITY | WORD 1 |

FIRST BIT TRANSMITTED → FIRST WORD OF EACH MESSAGE ← LAST BIT TRANSMITTED

FIG. 12B

| 1 2 3 4 5 6 7 8 9 10 11 12 13 | 14 15 16 | 17 18 19 20 21 22 | 23 24 | 25 26 27 28 29 30 | |
|---|---|---|---|---|---|
| MODIFIED Z-COUNT<br>MSB                                    LSB | SEQ<br>NCE<br>NO. | LENGTH<br>OF FRAME<br>MSB   LSB | STATION<br>HEALTH | PARITY | WORD 2 |

SECOND WORD OF EACH MESSAGE

TWO-WORD LENGTH MESSAGE HEADER    FROM RTCM SC-104 PAPER

ANTENNA APPARATUS FOR USE IN AUTOMOBILES

This is a division of application Ser. No. 09/440,176, filed Nov. 15, 1999, and claims priority to Japanese application no. 10-329742, filed Nov. 19, 1998.

BACKGROUND OF THE INVENTION

The present invention relates to an automobile antenna apparatus which is adaptable to an intelligent transportation system (referred to as ITS hereinafter) in its optimum condition.

FIG. 22 is a conceptual illustration of both ITS environment which can be considered to be almost ideal at the present time and the current automotive technologies (e.g., vehicle-mounted information communication technologies) which are arranged so as to be in harmony with the ITS environment.

As illustrated in FIG. 22, an automobile 310 running on an expressway 300 in the ITS environment, is required to have as many functions as possible, such as a radio receiving function 001 of receiving broadcast waves from an AM/FM radio broadcast station 301, a TV receiving function 002 of receiving broadcast waves from a TV broadcast station 302, a GPS receiving function 003 of receiving GPS waves from a GPS satellite 303, a transmitting/receiving function 004 of transmitting/receiving satellite communications and broadcast waves relayed by a communications satellite 304, a mobile communications function 005 for transmitting/receiving waves of a car phone and e-mail via a base station 305, a digital broadcast receiving function 006 for receiving digital broadcast waves, which mainly provides traffic information service and DGPS (differential global positioning service), from a digital broadcast station 306, an information exchange function 007 for exchanging information on the use of an electric toll collection (ETC) system with an automatic tollgate 307, and an anti-collision function 008 using an EHF (extremely high frequency) radar 308 mounted on the automobile 310.

The automobile 310 has to be equipped with an automobile antenna apparatus in order to fulfill the above functions. It also has to have artificial intelligence 009A including various types of sensors and high-performance microcomputers for recognition and its corresponding automatic control and a basic function 009B for controlling an operation such as running, communications, accident prevention, and car navigation.

FIG. 23 is a sketch of a prior art automobile antenna apparatus having the foregoing functions. As shown in FIG. 23, all of an AM/FM receiving antenna 311, two TV receiving antennas 312 and 312', two GPS receiving antennas 313 and 313', an automobile phone antenna 315, and an anti-collision EHF radar antenna 318 (a Mills cross compound antenna) are dispersed on the body of the automobile 310 in order to be adaptable to the media.

FIGS. 24A to 24C illustrate a concrete constitution of an anti-collision EHF radar 308 including the above radar antenna 318. FIG. 24A is a partly-broken view of the layout of the EHF radar 308, FIG. 24B is an illustration of the circuit arrangement thereof, and FIG. 24C is an illustration of a composite antenna beam 330 emitted from the radar antenna 318.

In FIGS. 24A and 24B, reference numeral 318a denotes a transmitting antenna element, and numeral 318b does a receiving antenna element. These antenna elements 318a and 318b constitute the anti-collision EHF radar antenna 318. Numeral 320 indicates a 60-GHz-EHF-wave generator including a gun oscillator 321, a circulator 322, a directional coupler 323, and a mixer 324. If the EHF radar 308 is activated, as shown in FIG. 24C, the composite antenna beam 330 is emitted from the anti-collision EHF radar antenna 318.

The direction (antenna directivity) of beams emitted from the antennas 311 to 314 in the prior art automobile antenna apparatus shown in FIG. 23, is set in advance to a fixed one in the early stage of use. If, therefore, the antenna directivity is not align with the direction of incoming waves, not only the optimum reception cannot be performed but also noise would be caused by a so-called multipass.

Since usually the emission range of the composite antenna beam 330 emitted from the radar antenna 318 shown in FIGS. 24A to 24C, is fixed, an obstruction can be detected only in a specific range in front of the body of the automobile 310. For this reason, the conventional anti-collision EHF radar 308 is very low in its obstruction detection capability, for example, at a curve in a road and thus it has been desired that the radar should be improved.

BRIEF SUMMARY OF THE INVENTION

The object of the present invention is to provide an automobile antenna apparatus having the advantages capable of conforming to the ITS environment in the optimum condition and emitting a beam in the optimum condition based on correct positional information of the automobile to thereby produce good transmitting and receiving results.

In order to attain the above object, an automobile antenna apparatus has the following feature in constitution. The other features will be clarified in the Description of the Invention.

An automobile antenna apparatus according to the present invention comprises an antenna control section for electronically and variably controlling an emitting-beam pattern of each of antennas mounted on an automobile, based on high-precision positional information of the automobile, to optimize a function of using an electric wave for vehicle.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 12A and 12B are diagrams of one part of a data format for representing the contents of differential correction data received by a DGPS data link in the automobile antenna apparatus according to the second embodiment of the present invention;

DETAILED DESCRIPTION OF THE INVENTION

Comprehensive Embodiment

Figure 1:
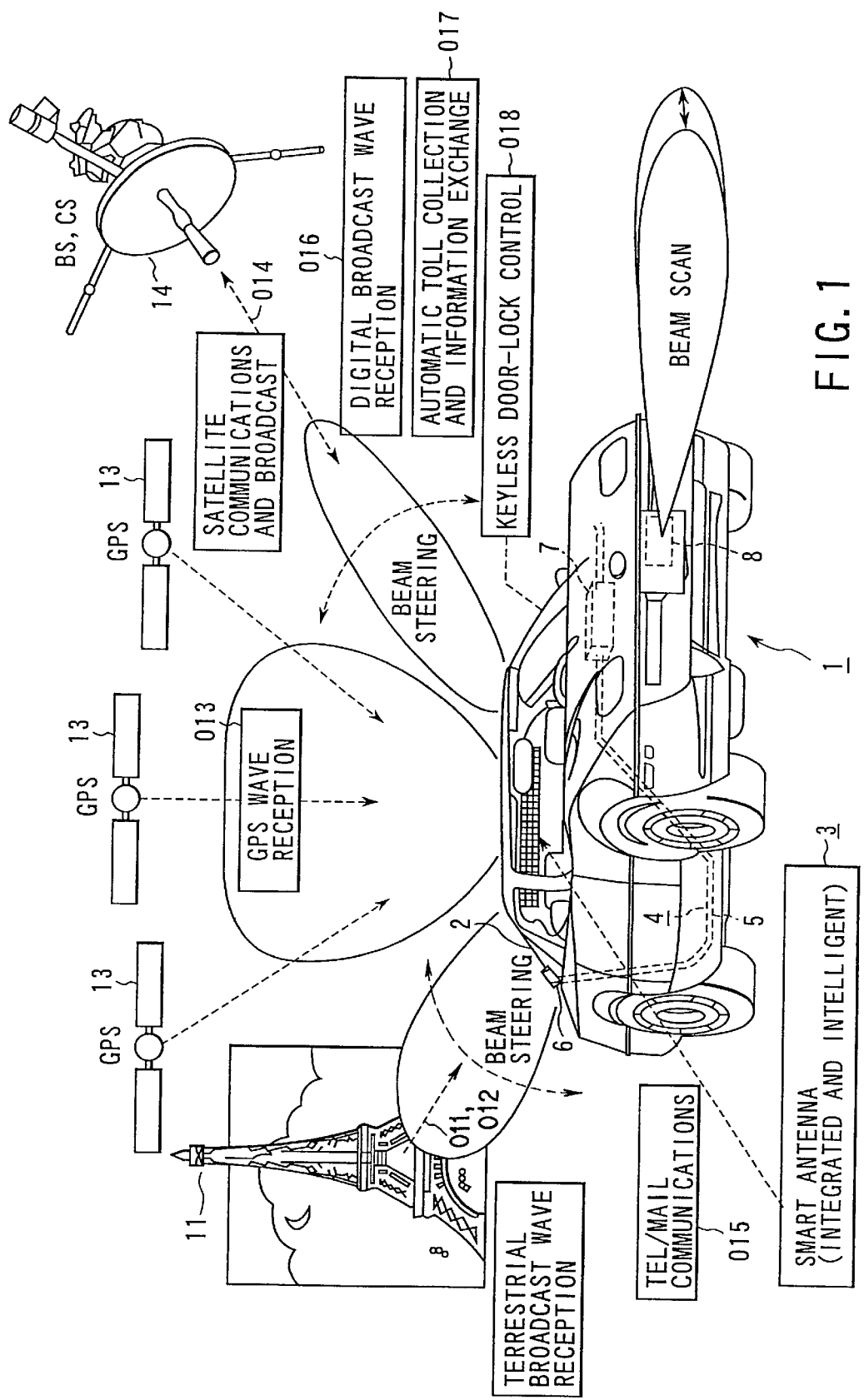
FIG. 1 is a sketch of the constitution of an automobile antenna apparatus according to a comprehensive embodiment of the present invention.

FIG. 1 is a sketch of the constitution of an automobile antenna apparatus according to a comprehensive embodiment of the present invention.

Referring to FIG. 1, an antenna 3, which is integrated and made intelligent so as to adapt to ITS environment, is mounted on a rear window 2 of an automobile 1. The antenna 3 is constituted of a thin-film conductor or the like and does not greatly protrude from the body of the automobile 1. Such an antenna is referred to as a smart antenna in the present invention.

The smart antenna 3 has a terrestrial broadcast receiving function 011/012 including a radio receiving function of receiving AM/FM radio broadcast waves from a general broadcast tower 11 and a TV receiving function of receiving TV broadcast waves therefrom, a GPS receiving function 013 of receiving GPS waves from a plurality of GPS satellites 13, a satellite-communications wave/satellite-broadcast wave transmitting/receiving function 014 of transmitting/receiving satellite-communications waves relayed by a communications/broadcast satellite 14 and of receiving satellite-broadcast waves relayed thereby, a mobile communication function 015 of transmitting/receiving signals of a car phone, e-mail, etc. through a base station (not shown), a digital broadcast receiving function 016 for receiving digital broadcast waves from a digital broadcast station (not shown) which aims chiefly at providing a traffic information service and a DGPS (differential global positioning system service), an information exchange function 017 for exchanging information about the use of an electric toll collection system with an automatic tollgate (not shown), and a keyless door-lock control function 018 of controlling keyless door-lock.

An electronic network 4 is formed in the automobile 1 and includes an antenna unit 6. The antenna unit 6 is attached to the smart antenna 3 and connected to a car computer network containing a center console 7 through an optical fiber LAN using an optical fiber 5 as a signal transmission line.

The antenna unit 6 comprises a control circuit section (not shown) which will be detailed later. The control circuit section has a 4-channel diversity receiving function for fulfilling the terrestrial broadcast receiving function 011/012 and transmitting/receiving function 014, and a so-called beam steering function for varying an emitting beam such that its directivity coincides with the direction of the broadcast tower 11 or the communications satellite 14, as shown in FIG. 1. These functions will be detailed later.

An anti-collision EHF (extremely high frequency) radar 8 is mounted on the front of the automobile 1. The beam of the radar 8 can be emitted appropriately within a given angle range by the control circuit section. This will also be detailed later.

First Embodiment

Figure 2:
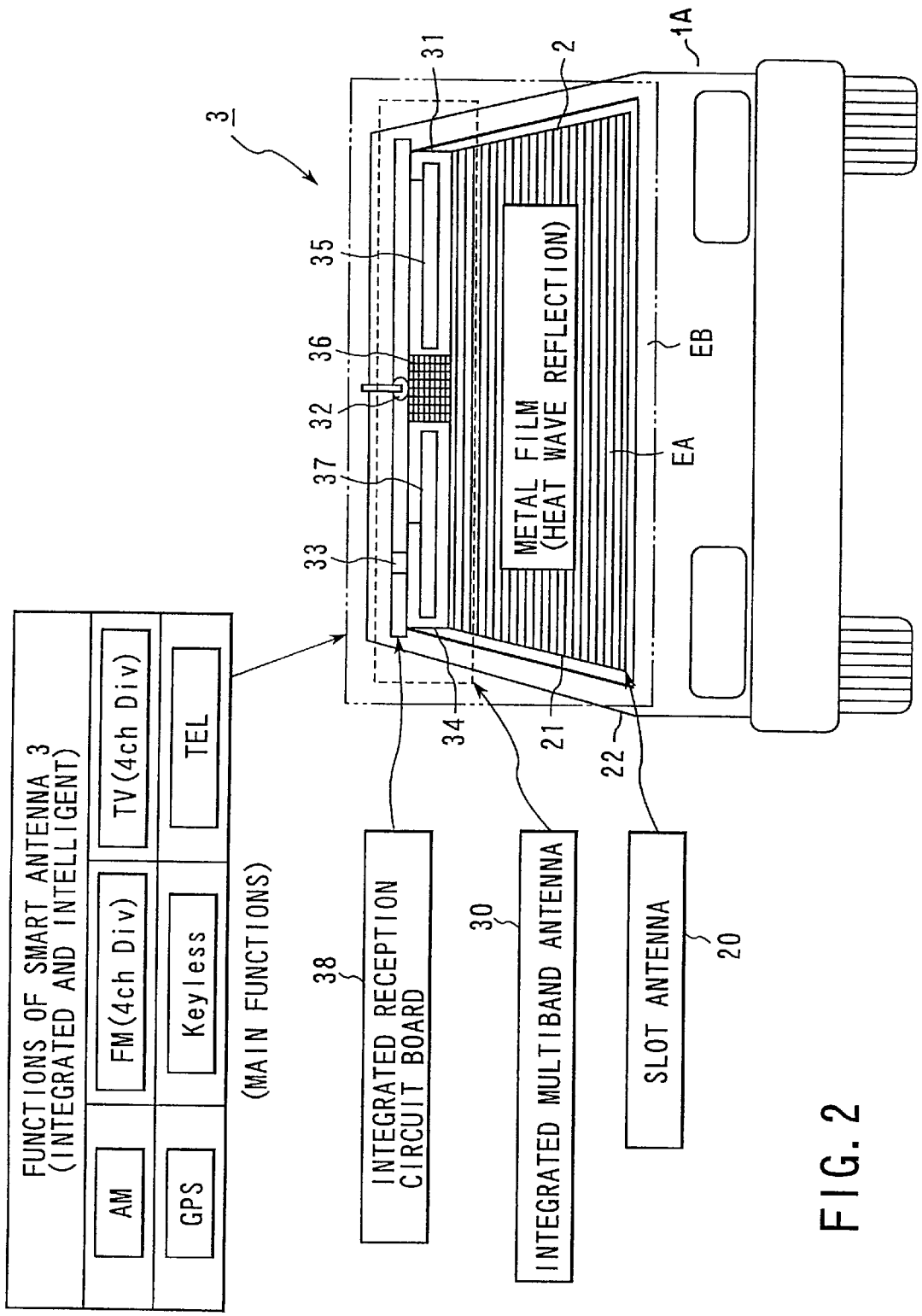
FIG. 2 is a sketch of the constitution of a smart antenna of an automobile antenna apparatus according to a first embodiment of the present invention.
Figure 3:
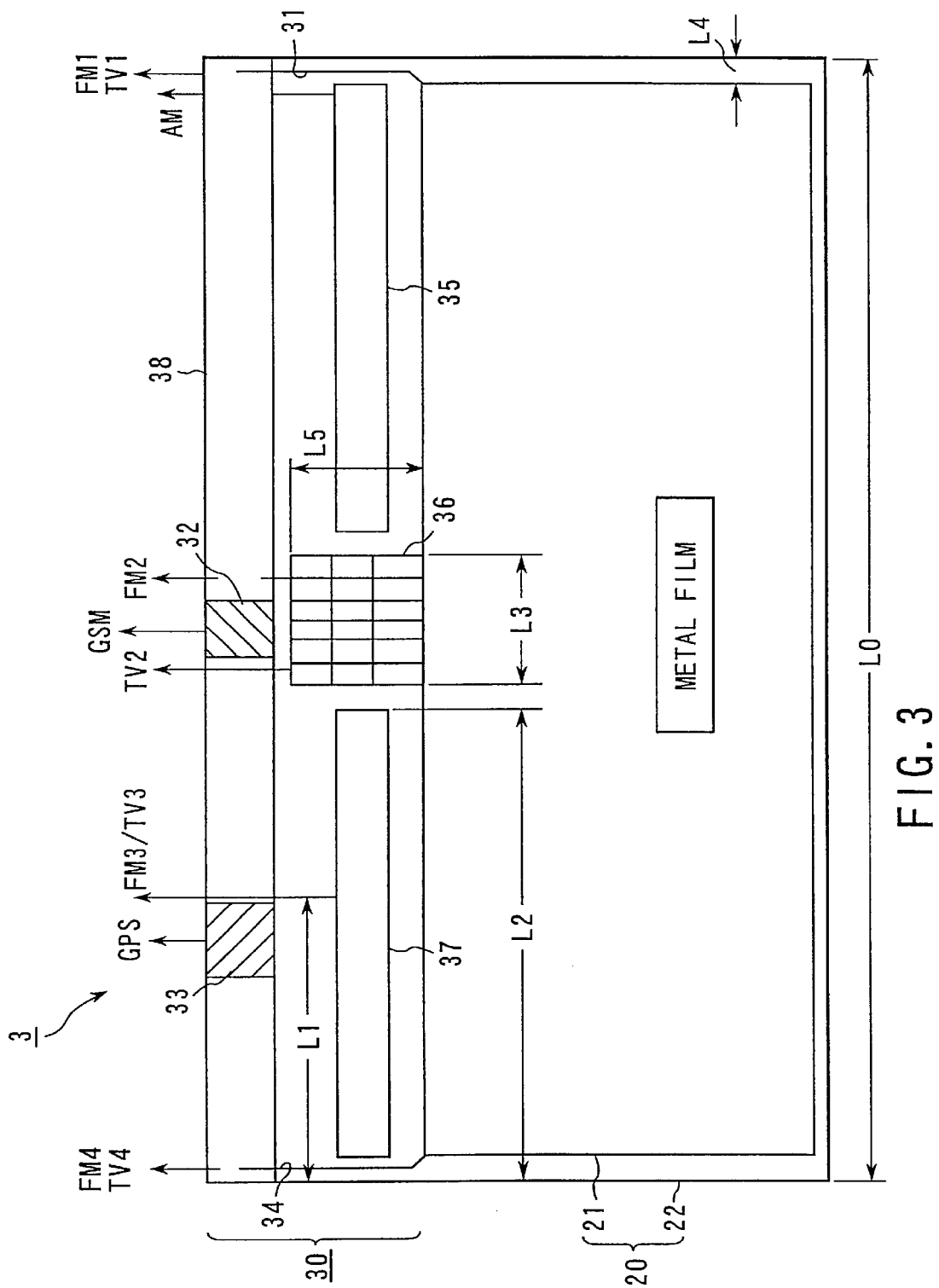
FIG. 3 is a view showing the shapes and arrangement of various antenna elements of the smart antenna illustrated in FIG. 2.
Figure 4:
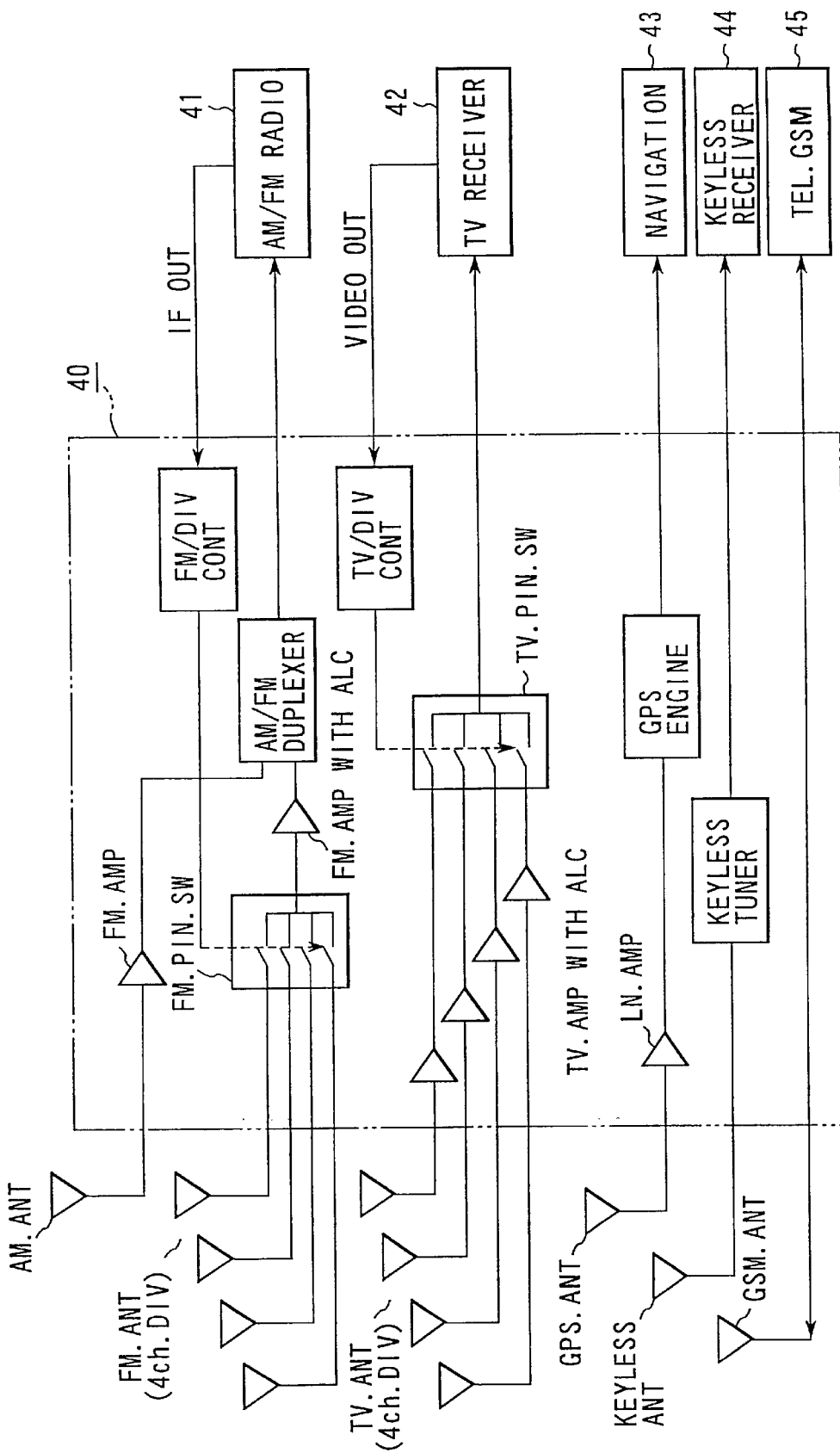
FIG. 4 is a block diagram illustrating the constitution of a connection circuit interposed between a group of the antenna elements of the smart antenna shown in FIG. 2 and a group of transmission/reception sets.

FIGS. 2 to 4 illustrate an automobile antenna apparatus according to a first embodiment of the present invention. Of these figures, FIG. 2 is a schematic view of the constitution of the smart antenna 3.

As shown in FIG. 2, a slot antenna 20 is mounted on a rear window 2 of an automobile 1A. The slot antenna 20 has a slot space (window glass) surrounded with both a first region EA in which a metal film covers part of a defogger (hot wire) 21 formed almost all over the rear window 2 and a second region EB formed of a metal portion of the car body including a window frame 22.

An integrated multiband antenna 30 is mounted on the upper part of the rear window 2. The multiband antenna 30 includes antenna elements 31 to 37, which are formed of thin-film conductive pieces of different shapes such that at least some of the elements are inserted into the slot space, and an integrated reception circuit board 38 which is provided to select the antenna elements 31 to 37 and switch a feeding point of the slot antenna 20.

The smart antenna 3 including both the slot antenna 20 and integrated multiband antenna 30 has the functions as shown by the blocks in the upper-left part of FIG. 2. More specifically, the smart antenna 3 has receiving functions of receiving an AM wave, an FM wave (4-channel diversity), a TV wave (4-channel diversity) and a GPS wave and transmitting/receiving functions of transmitting/receiving waves for a car phone (TEL) and keyless door-lock control (Keyless).

FIG. 3 is a diagram showing the shapes and arrangement of the slot antenna 20 and antenna elements 31 to 37 of the multiband antenna 30. For reference purposes, the following lengths of the antenna elements are given as representative examples: $L_0$=about 1235 mm, $L_1$=about 230 mm, $L_2$=about 460 mm, $L_3$=about 160 mm, $L_4$=about 12 mm, and $L_5$=about 75 mm.

FIG. 4 is a block diagram showing an arrangement of a connection circuit 40 interposed between a group of the antenna elements and that of transmission/reception sets. Referring to FIG. 4, the connection circuit 40 includes amplifiers (AM.AMP, TV.AMP and LN.AMP), antenna element select switches (FM.PIN.SW and TV.PIN.SW), an AM/FM duplexer, a GPS engine, a keyless tuner, and diversity controllers (FM.DIV.CONT and TV.DIV.CONT). The group of transmission/reception sets includes an AM/FM radio set 41, a TV receiver set 42, a navigation system 43, a keyless receiver 44 and a TEL GSM set 45. The group of antenna elements are connected to the transmission/reception sets via the connection circuit 40.

If, therefore, the antenna elements are selectively combined with one another by means of the connection circuit 40, a special antenna capable of diversity reception and having a special antenna characteristic by request, can be constituted appropriately.

Second Embodiment

Figure 5:
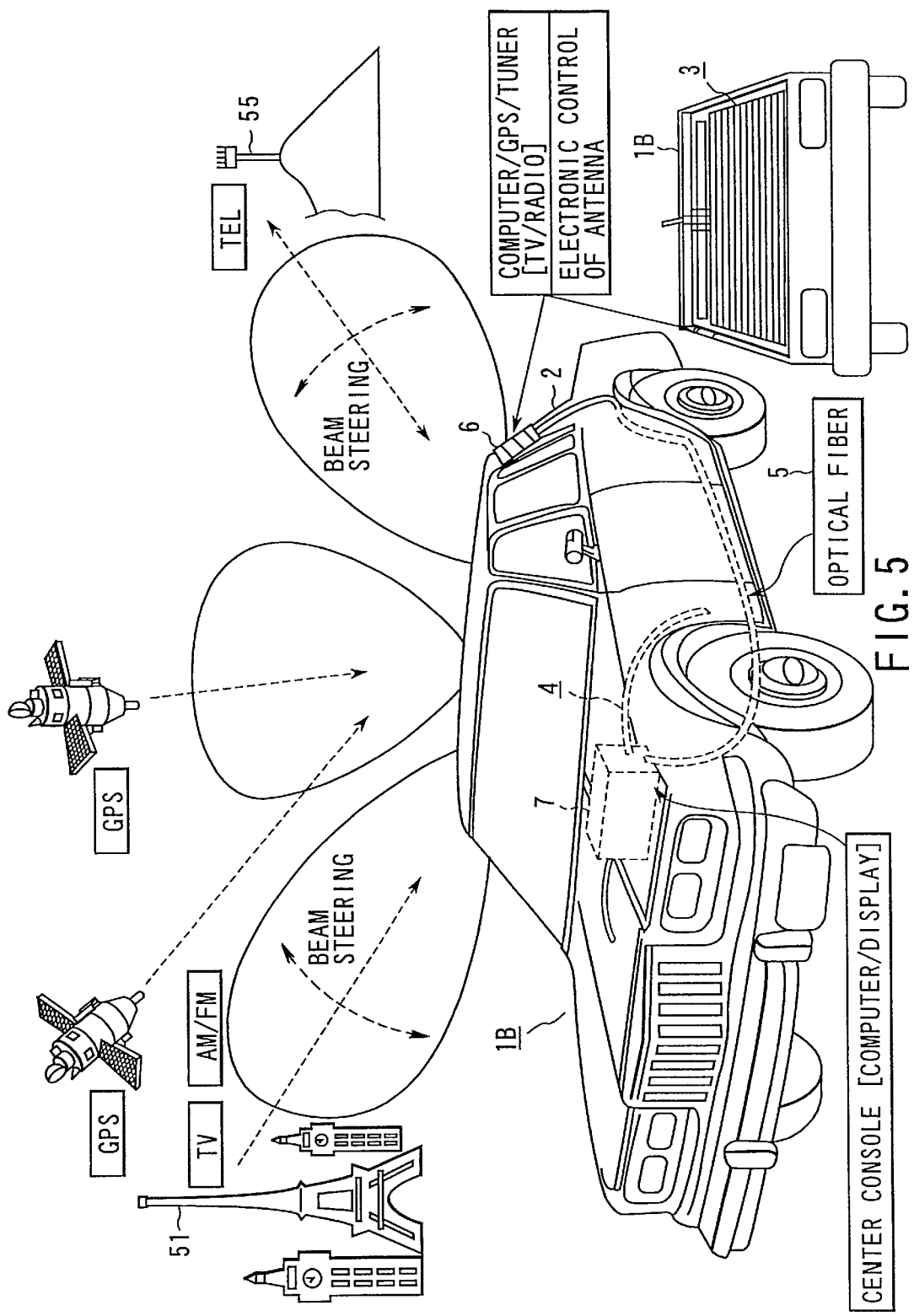
FIG. 5 is a sketch of the constitution of an automobile antenna apparatus according to a second embodiment of the present invention.

FIGS. 5 to 14 illustrate an automobile antenna apparatus according to a second embodiment of the present invention. Of these figures, FIG. 5 is a schematic view of the constitution of the antenna apparatus. An automobile 1B is mounted with an advanced antenna apparatus which is a great improvement of the foregoing automobile antenna apparatus of the first embodiment.

The advanced antenna apparatus provides with a specific means (space diversity/beam steering) for optimizing its antenna characteristics when the smart antenna 3 receives various terrestrial broadcast waves or performs terrestrial mobile communications.

The advanced antenna apparatus is integrated with a DGPS (differential GPS) engine (detailed later) to acquire and use high-precision positioning information and correctly determine a relative relationship in position between the automobile 1B and a general broadcast tower 51 or a communication base station 55, thereby optimally controlling the corresponding antenna elements and control circuits. Consequently, the antenna apparatus can be improved in performance.

The advanced antenna apparatus also includes an electronic network 4. As has been described in FIG. 1, the electronic network 4 has an antenna unit 6 mounted on the rear of the automobile 1B, and the antenna unit 6 is connected to a car-mounted computer network containing a center console 7 through a LAN (local area network) using an optical fiber 5 as a signal transmission line. Various information items acquired by the antenna unit 6 thus allow the overall electronic control of the automobile 1B.

Figure 6:
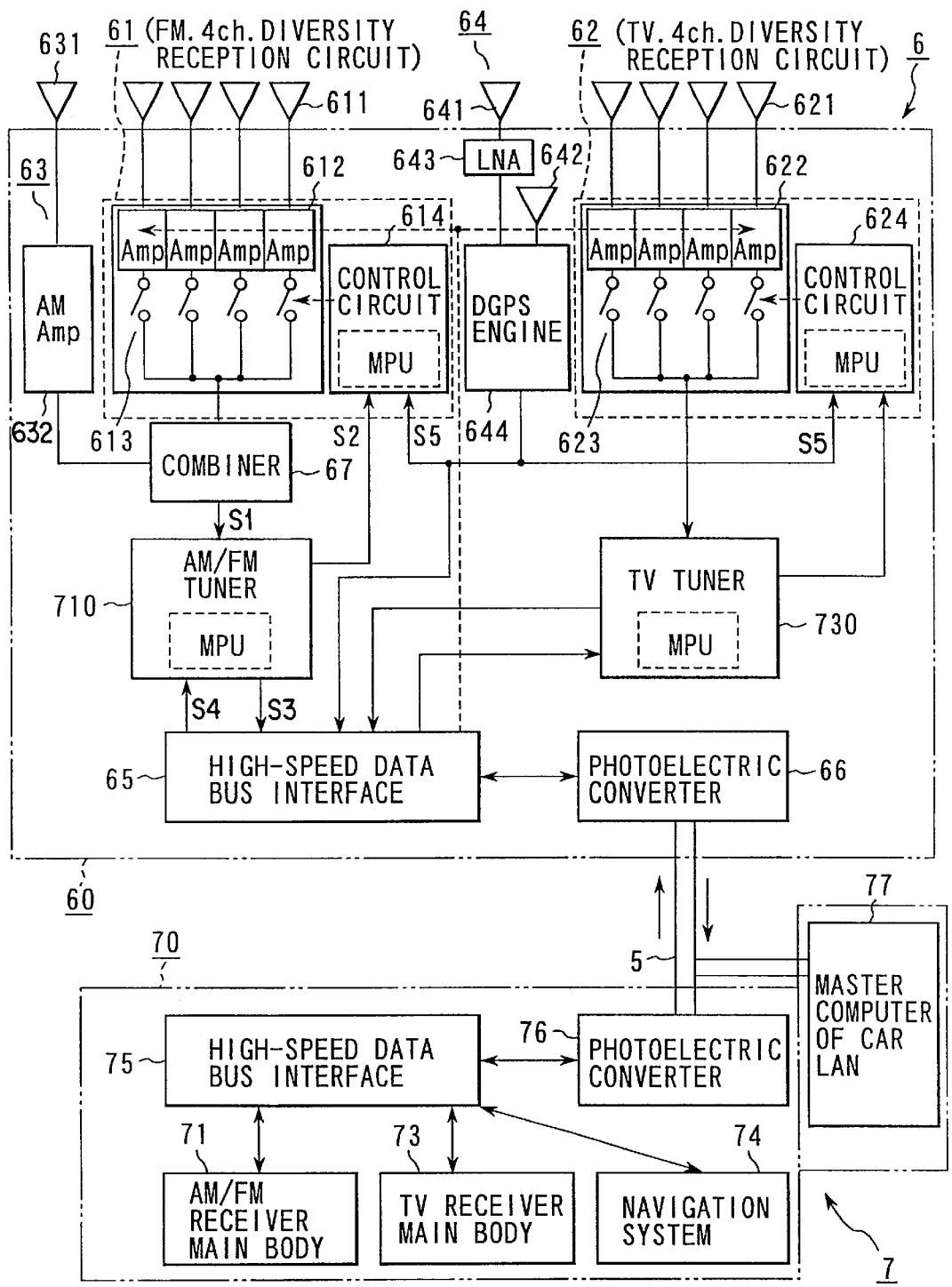
FIG. 6 is a block diagram showing a fundamental structure of an advanced antenna apparatus corresponding to the automobile antenna apparatus illustrated in FIG. 5 which is improved in performance.

FIG. 6 is a block diagram illustrating a basic constitution of the above advanced antenna apparatus. The antenna unit 6 includes a control circuit section 60 having a multifunction as shown in the upper part of FIG. 6, and the center console 7 has a reception set section 70 as shown in the lower part thereof.

The antenna unit 6 includes an AM reception circuit 63 and a DGPS reception circuit 64 in addition to an FM 4-channel diversity reception circuit 61 as an FM reception circuit and a TV 4-channel diversity reception circuit 62 as a TV reception circuit. The control circuit section 60 includes an AM/FM tuner 710 separated from an AM/FM receiver main body 71 of the reception set section 70, and a TV tuner 730 separated from a TV receiver main body 73. The AM/FM tuner 710 and TV tuner 730 are incorporated into the section 60 as one unit. For this reason, pre-tuning, such as frequency selection of received broadcast waves and level control thereof (gain control of amplifier), can be simplified, and the optimum control of each receiver can be performed smoothly.

The FM 4-channel diversity reception circuit 61 includes amplifiers 612 for amplifying signals output from four windowpane antenna elements 611, select switches 613 for selecting the amplified signals, and a control circuit 614 for controlling ON and OFF states of the select switches 613.

The TV 4-channel diversity reception circuit 62 includes amplifiers 622 for amplifying signals output from four windowpane antenna elements 621, select switches 623 for selecting the amplified signals, and a control circuit 624 for controlling ON and OFF states of the select switches 623.

The AM reception circuit 63 includes a single windowpane antenna element 631 and an amplifier 632 for amplifying a signal output from the antenna element 631.

The DGPS reception circuit 64 includes a DGPS engine 644 activated in response to signals output from a GPS antenna element 641 and a data link 642. Reference numeral 643 indicates an LNA (low noise amplifier). The DGPS reception circuit 64 is capable of acquiring measurement information about position, speed, direction and the like with high precision. This circuit 64 will be described in detail later.

In FIG. 6, reference numerals 65 and 75 each indicate a high-speed data bus interface, 66 and 76 each denote a photoelectric converter, 67 shows a combiner, and 77 represents a master computer of a LAN. In FIG. 6, reference marks S1 to S5 each indicate various signals.

Figure 7:
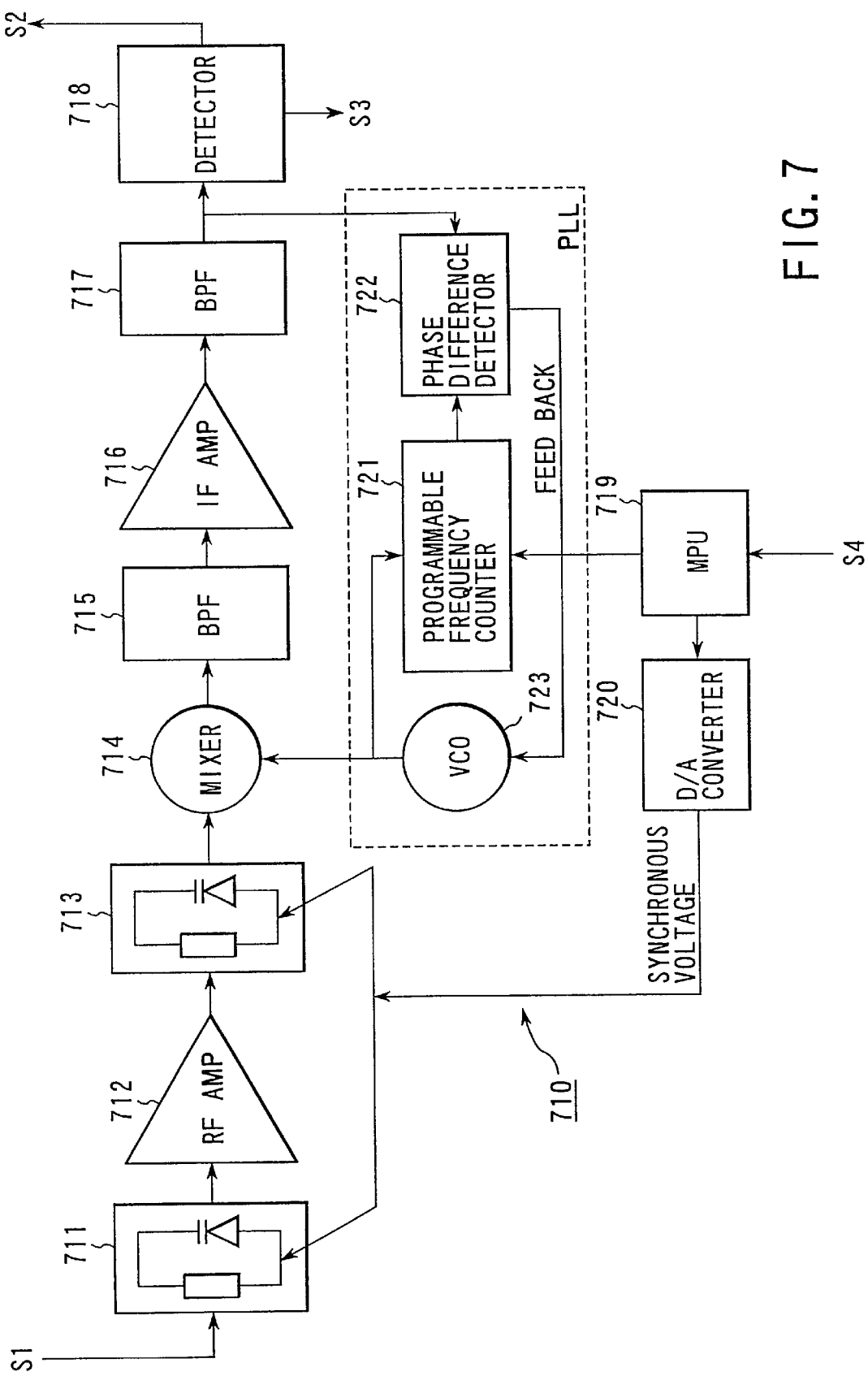
FIG. 7 is a block diagram of the internal structure of an AM/FM tuner of the automobile antenna apparatus according to the second embodiment of the present invention.

FIG. 7 is a block diagram illustrating the internal structure of the AM/FM tuner 710. Since the TV tuner 730 has basically the same structure as that of the AM/FM tuner 710, its description is omitted. If, as indicated by the arrow on the left side of FIG. 7, an AM/FM antenna signal Si is input, it is tuned by a first tuning circuit (resonator) 711 including an induction coil and a variable-capacitance diode, and the tuned signal is amplified by an RF amplifier 712. The amplified signal is tuned again by a second tuning circuit (resonator) 713 and then supplied to a mixer 714. The mixer 714 mixes the tuned signal with an output signal of a voltage control oscillation circuit 723 (described later). The mixed signal passes through a band-pass filter 715 and is amplified by an IF amplifier 716. The amplified signal is supplied to a detector 718 through another band-pass filter 717 and detected and demodulated as an FM intermediate-frequency signal. This signal is output to the control circuit 614 as a feedback signal S2 on one hand, and it is output to a high-speed data bus interface 65 as a reception signal S3 on the other hand.

An operation signal S4, which is input through the interface 65 as indicated by the arrow in the lower part of FIG. 7, is supplied to a microprocessor 719 serving as a slave computer (sub-brain computer). On one hand an output signal of the microprocessor 719 is converted to an analog signal by a D/A converter 720 and supplied to the variable-capacitance diodes of the two tuned circuits (resonators) 711, 713 as tuned voltages; on the other hand it is transmitted to a programmable frequency counter 721 in a PLL (phase-locked loop) as a preset signal of parameter [N/P]. Output signals (obtained by frequency-dividing a local oscillation signal of an output of a VCO) of the counter 721 are supplied to one of input terminals of a phase difference detector 722. Some of IF (intermediate frequency) signals which have passed through the band-pass filter 717, are supplied to the other input terminal of the detector 722. A phase difference signal detected by the detector 722 is input to the voltage control oscillation circuit 723. An output of the circuit 723 is sent to the mixer 714 and fed back to the programmable frequency counter 721.

Since the PLL is so operated that a phase-difference output of the detector 722 always becomes zero, the frequency of a local oscillation signal output from the circuit 723 is determined in response to the operation signal S4 (a channel select signal to be received). Thus, the frequency of a signal to be received by the tuner 710 is determined by digital control.

Figure 8:
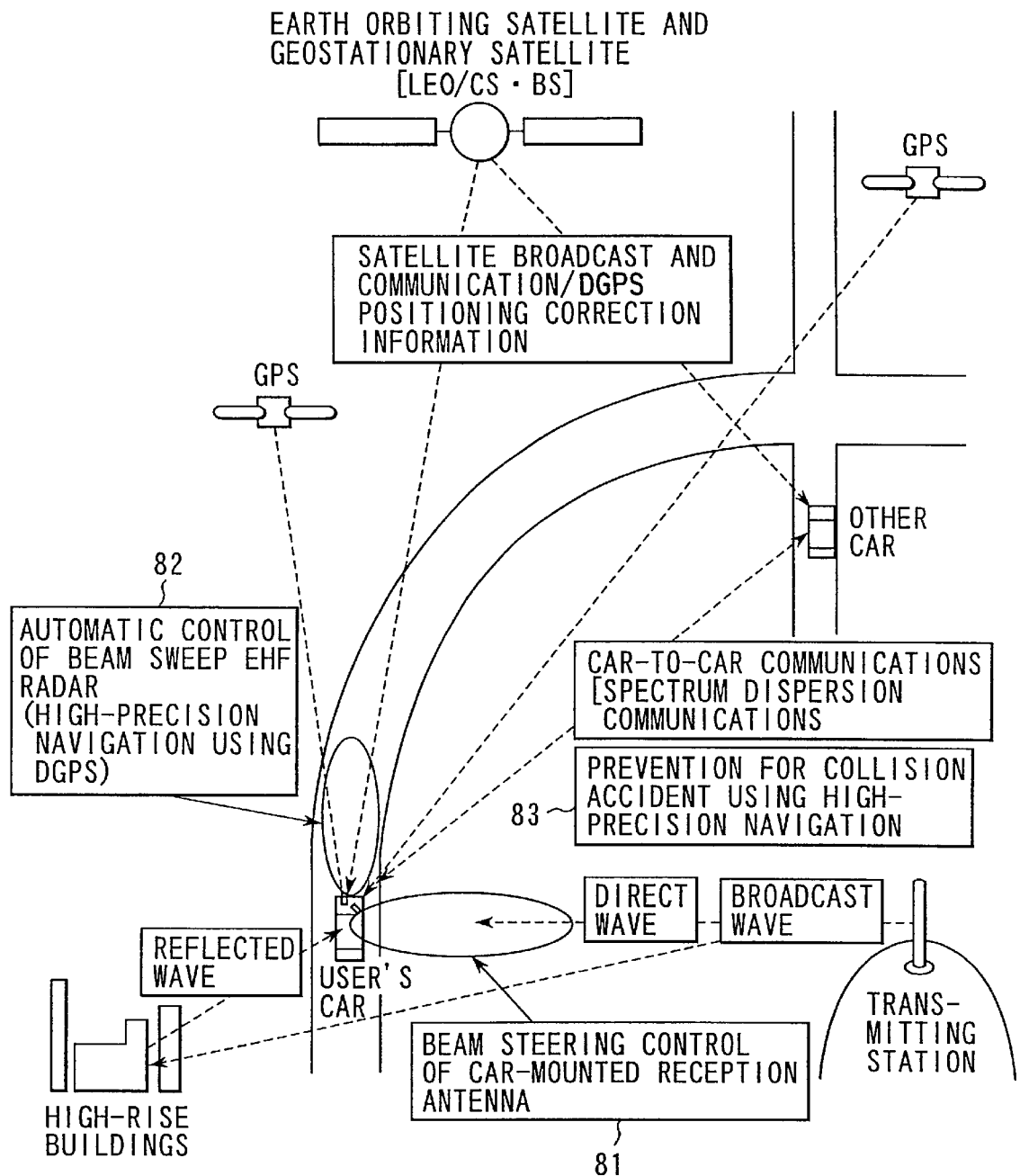
FIG. 8 is a sketch of a DGPS in the automobile antenna apparatus shown in FIG. 5 which is applied to the ITS.
Figure 10:
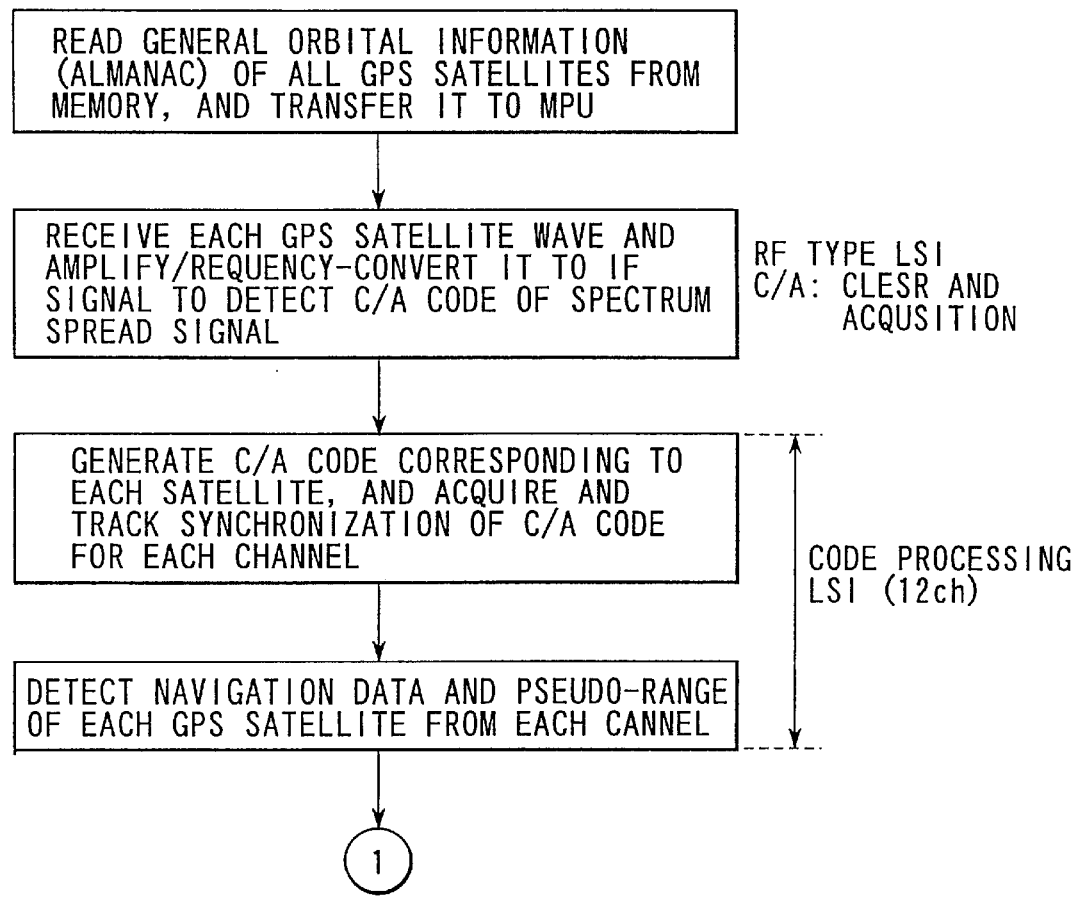
FIG. 10 is a flowchart showing one part of algorithm information processing for DGPS positioning and differential correction in the automobile antenna apparatus illustrated in FIG. 5.
Figure 11:
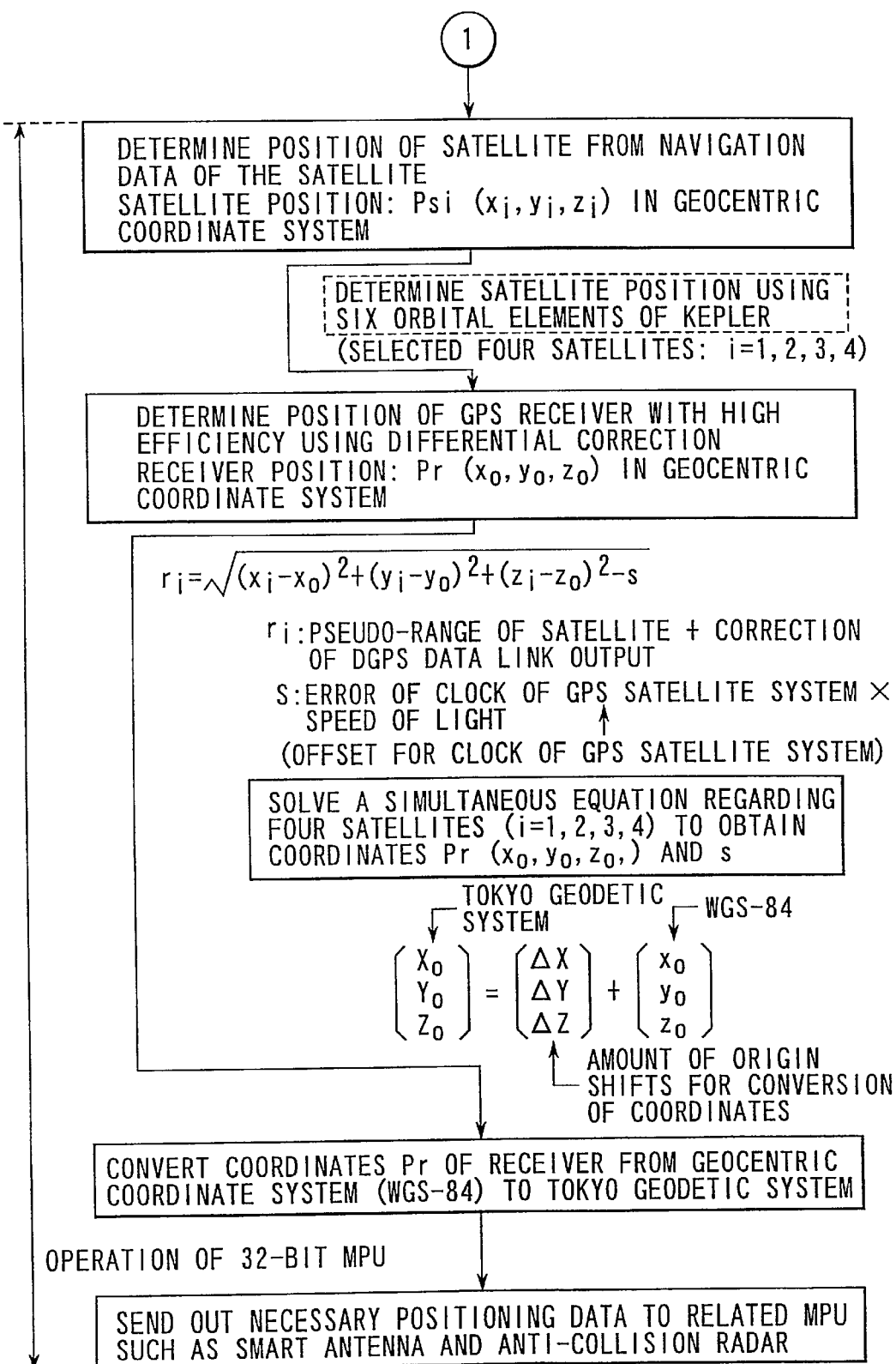
FIG. 11 is a flowchart of the other part of the algorithm information processing shown in FIG. 10.

Next, the foregoing DGPS reception circuit 64 will be described. FIG. 8 is a sketch for explaining the DGPS applied to the ITS, FIG. 9 is a block diagram of the arrangement of the DGPS reception circuit 64, and FIGS. 10 and 11 are flowcharts of algorithm information processing for DGPS positioning and differential correction.

As sketched in FIG. 8, the DGPS high-precision positioning information can be used widely for control 81 of beam steering of a car-mounted reception antenna, automatic control 82 of a beam-scan EHF radar, control 83 for preventing a head-on collision, and the like.

Figure 9:
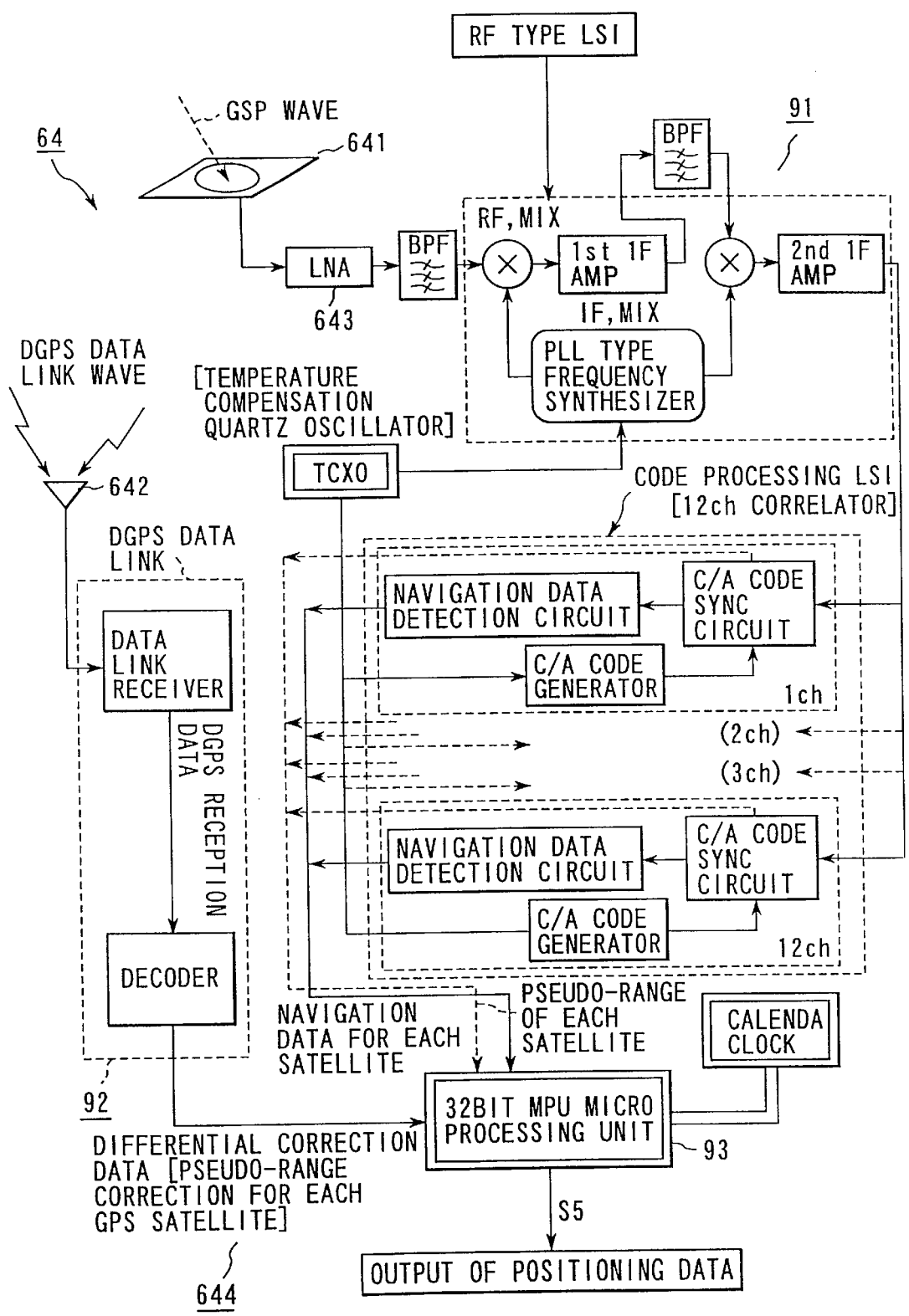
FIG. 9 is a block diagram of the constitution of a DGPS receiving circuit of the automobile antenna apparatus shown in FIG. 5.

As illustrated in FIG. 9, the DGPS reception circuit 64 includes a DGPS engine 644. The DGPS engine 644 is constituted by adding a DGPS data link 92 for receiving differential correction data to a normal GPS receiver 91 having the GPS-wave receiving patch antenna 641 and integrating them as one unit. If signals and data are processed in accordance with the algorithm shown in FIGS. 10 and 11, high-precision positioning data S5 is output. This data S5 is transmitted to a unit related to the smart antenna 3 and the EHF computer network 8, through the car-mounted computer network of the optical fiber 5.

Figure 13:
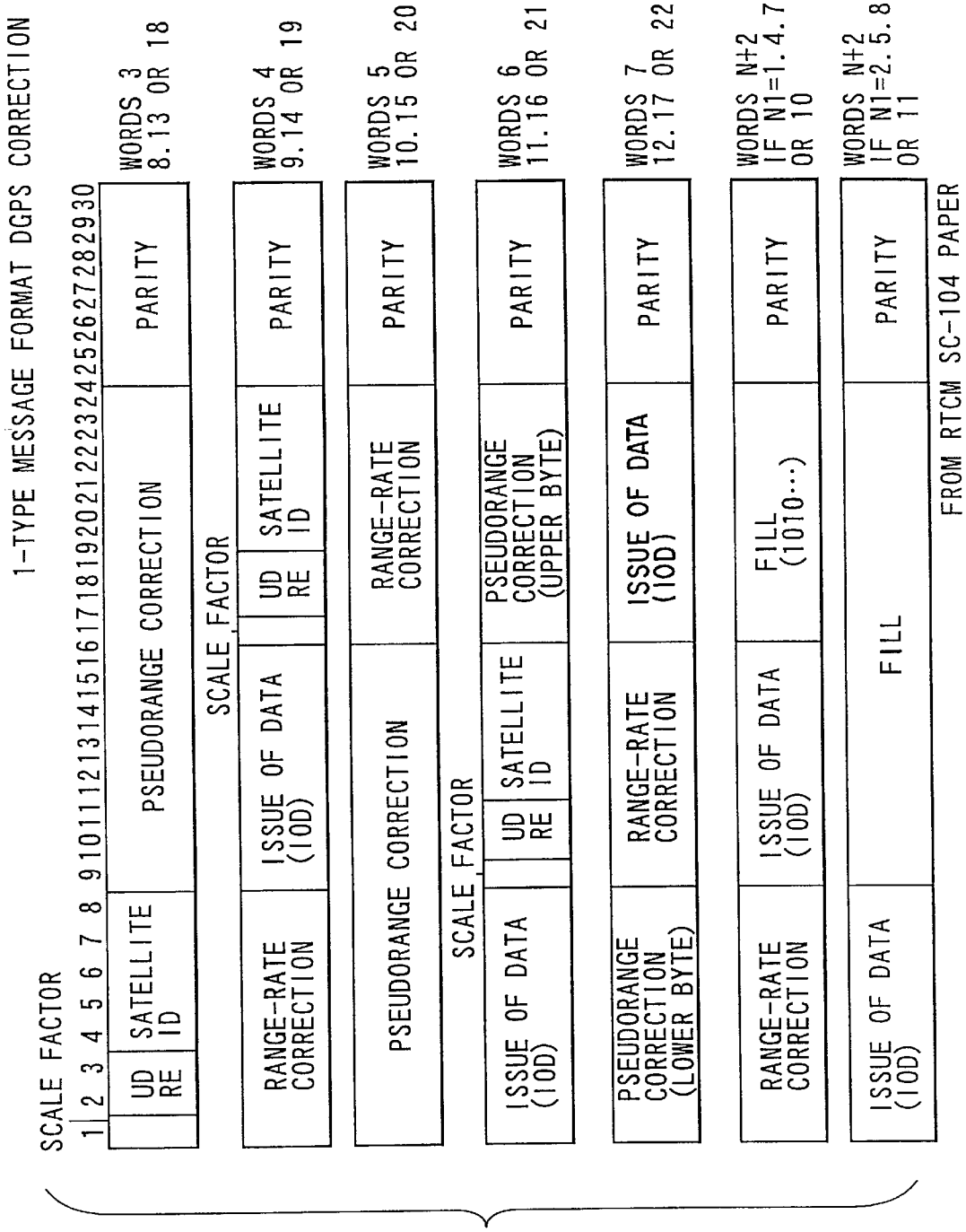
FIG. 13 is a diagram of the other part of the data format shown in FIGS. 12A and 12B.
Figure 14:
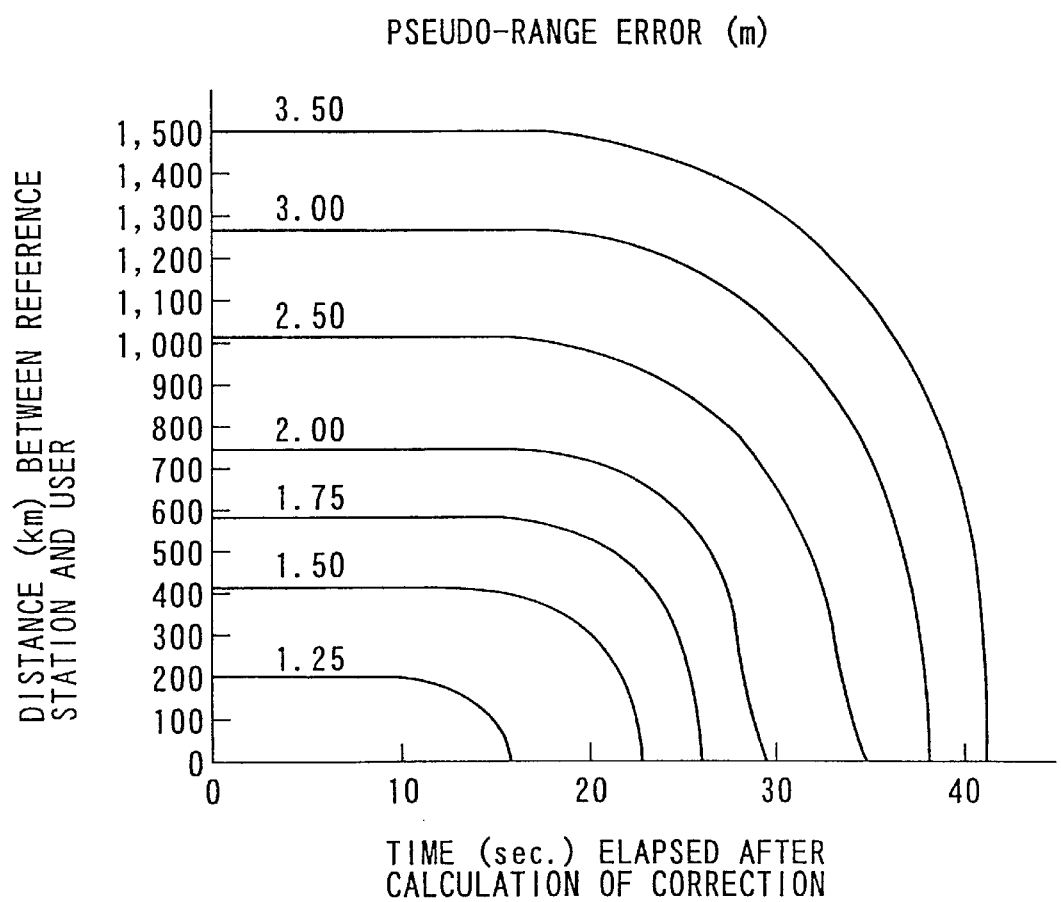
FIG. 14 is a graph showing variations in measurement errors of the DGPS in the automobile antenna apparatus of FIG. 2, based on the relationship between the distance and elapsed time.

The contents of differential correction data (pseudo-range correction for each GPS satellite, etc.), received by the DGPS data link 92 shown in FIG. 9, are defined in predetermined format as shown in FIGS. 12A, 12B and 13. If, therefore, the contents are decoded and detected and then guided to an MPU (microprocessor unit) 93 shown in FIG. 9 to be processed according to the above algorithm, differential correction of high-precision positioning can be achieved.

A GPS positioning error depends upon both a distance between a reference station and a user (usually a distance between a wave transmitter of the data link 92 and a user's car) and time (seconds) elapsed after reception of correction data and acquisition of corrected values. The error is approximately 5 m or less.

FIGS. 12A and 12B to 14 are extracted from "Prospects for High-Precision GPS," Nikkan Kogyo Shimbun, under the supervision of Ministry of Posts and Telecommunications, Aviation and Maritime Division and Land Mobile Communications Division.

Third Embodiment

Figure 15A:
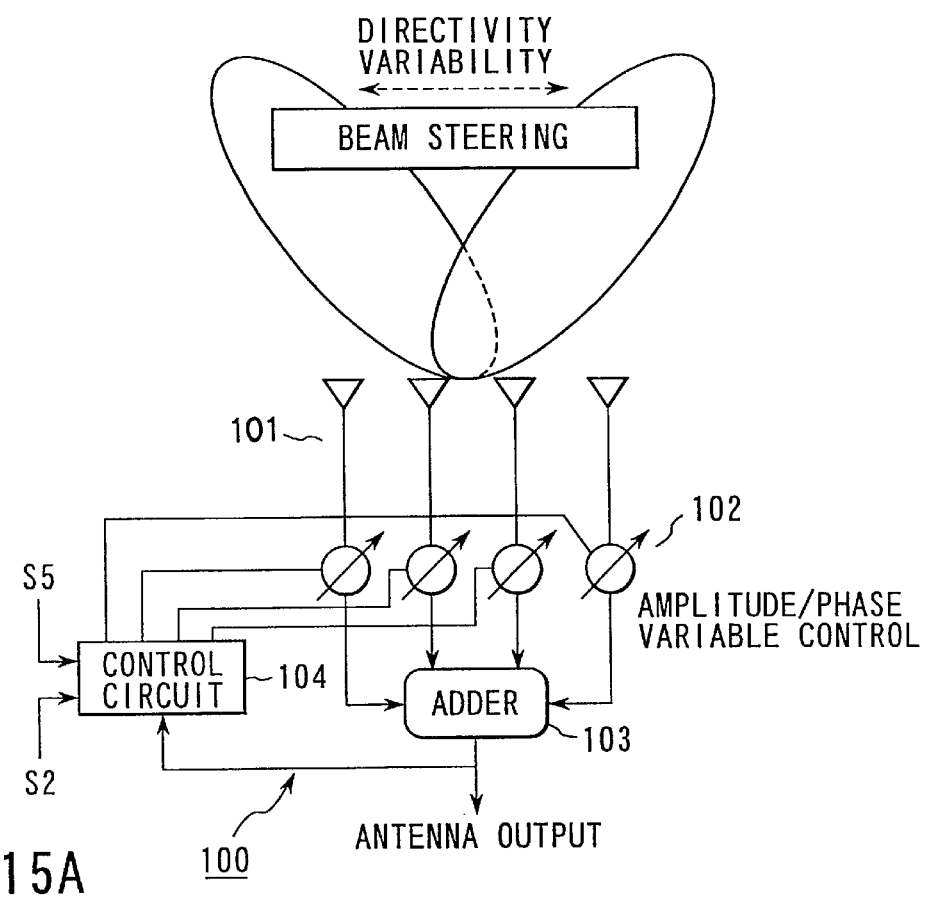
FIGS. 15A and 15B are illustrations of a receiving circuit having a beam steering function in an automobile antenna apparatus according to a third embodiment of the present invention.
Figure 15B:
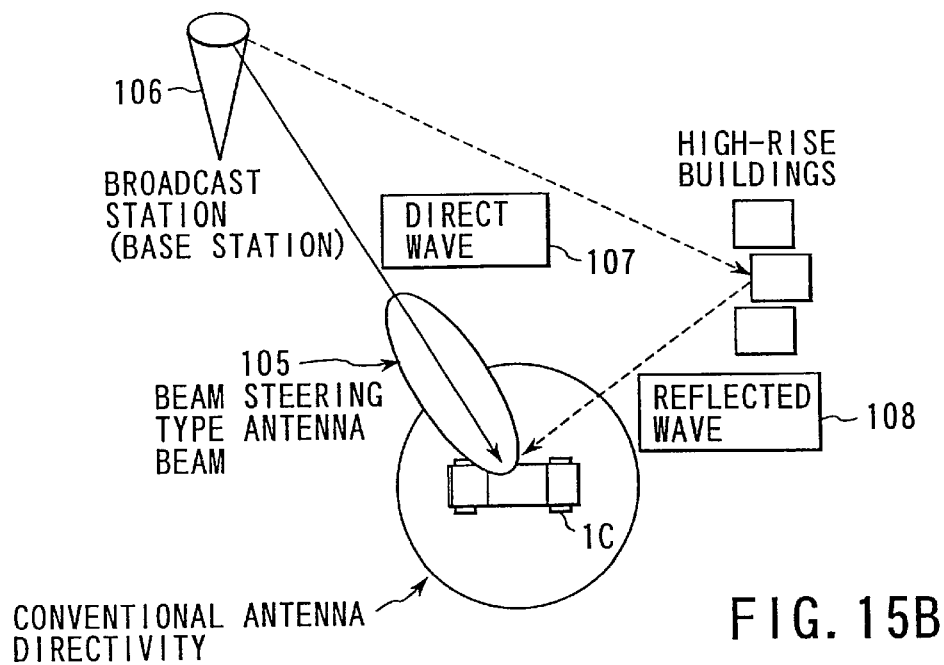

FIGS. 15A and 15B are block diagrams schematically showing an arrangement and an operation of a reception circuit 100 having a beam steering function, which is used as an FM reception circuit 61 or a TV reception circuit 62 of an automobile antenna apparatus according to a third embodiment of the present invention.

The reception circuit 100 shown in FIG. 15A is assumed to be one corresponding to the FM 4-channel diversity reception circuit 61 of the second embodiment.

Referring to FIG. 15A, the reception circuit 100 has four antenna elements 101 (corresponding to the windowpane antenna elements 611 in FIG. 6) to each of which a gain (amplitude) and phase variable control circuit 102 is connected. The circuit 102 includes both a means for selecting an antenna element based on antenna directivity information and a means for variably setting a relationship in phase between input signals corresponding to the waves received by the selected antenna element based thereon (neither of which is shown).

The respective signals output from the gain and phase variable control circuit 102 are added and mixed together by means of an adder (mixer) circuit 103, and the mixed signal is supplied to the AM/FM tuner 710 or TV tuner 730 and to a control circuit 104. The control circuit 104 receives a positioning information signal S5 from the DGPS reception circuit 64 and a feedback signal S2 from the AM/FM tuner 710 containing reception channel information. The control circuit 104 thus acquires always information as to which direction the antenna directivity should be set, based on the present position information of a user's car and the original position information of received waves, and controls the variable control circuit 102 based on the acquired information.

The reception circuit 100 of the third embodiment is able to variably control the overall emitting-beam pattern of the antenna elements 101 and thus perform a so-called beam steering without driving the antenna elements 101. In the third embodiment, the original diversity receiving function and the beam steering function can be fulfilled in combination with each other.

Consequently, as shown in FIG. 15B, an antenna beam 105 of an automobile 1C can exactly be directed to a broadcast station (base station) 106 to receive a direct wave 107, thereby preventing multipass phasing due to both the direct wave 107 and its reflected wave 108. The optimum reception can thus be achieved.

The advanced antenna apparatuses of the foregoing second and third embodiments have the following features:

(1) Since the control circuit section 60 of the antenna unit 6 and the reception set section 70 of the center console 7 are connected to each other by means of the optical fiber 5, a coaxial cable or a harness need not be used, and an electrical noise caused by actuators and microcomputers in the automobile can be prevented from affecting the antenna apparatus.

(2) The gain and receiving frequency of the antenna amplifiers (AM/FM/TV) can be optimized (pretuned) in response to an operation signal, a tuner output signal and the like.

(3) The control of diversity adapted to the wave conditions of each area can be optimized on the basis of information (position/speed/direction) of the DGPS engine 644.

(4) The antenna beam can be directed to the coming direction of a requisite wave in response to the output signal S2 of the tuner and that S5 of the DGPS engine 644, thus adapting the antenna apparatus to the ITS (optimizing reception and communications).

(5) Since the antenna apparatus is connected to the car LAN of a high-speed data bus, the antenna apparatus is provided with the ultimate ability required in future, such as ITS and artificial intelligence.

Fourth Embodiment

Figure 16A:
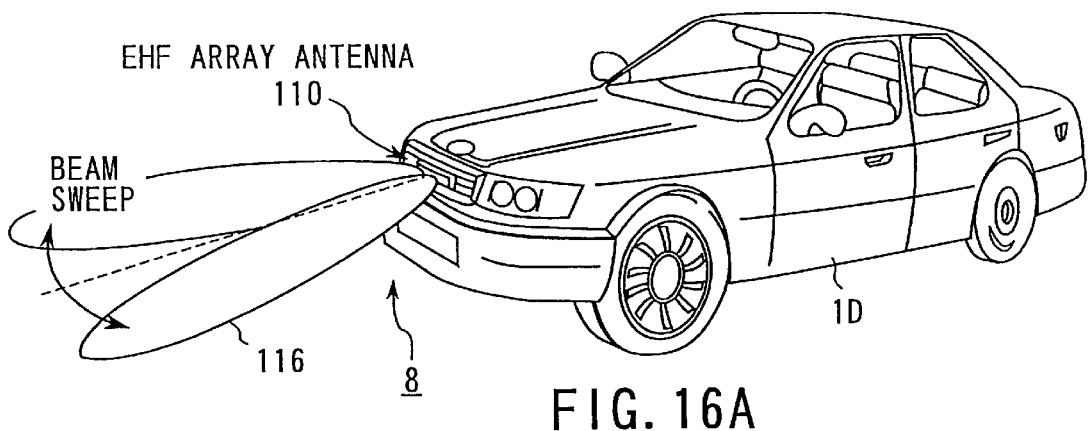
FIGS. 16A to 16D are illustrations specifically showing an anti-collision EHF radar (a beam-scan radar) of an automobile antenna apparatus according to a fourth embodiment of the present invention.
Figure 16B:
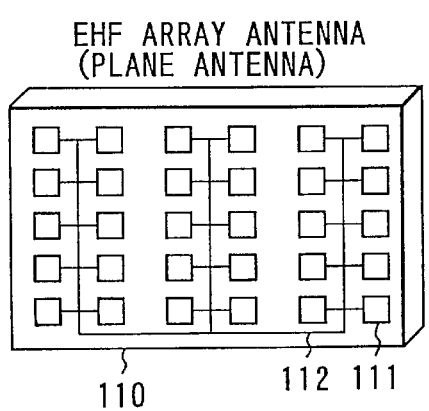
Figure 16C:
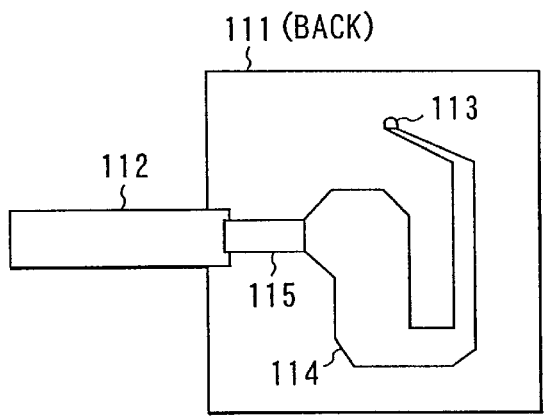
Figure 16D:
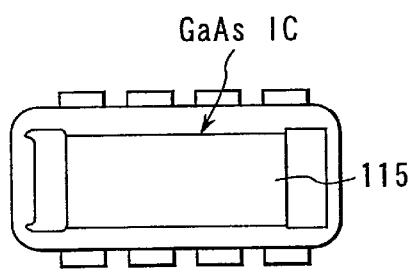

FIGS. 16A and 16D to 21 specifically show the structure of an anti-collision EHF radar (beam-sweep radar) 8 of an automobile antenna apparatus according to a fourth embodiment of the present invention. Referring to FIG. 16A, an EHF array antenna 110 is mounted on the front of an automobile 1D such that it can emit an EHF wave of 60 GHz to 90 GHz. This antenna 110 includes, as shown in FIG. 16B, a number of active patch antennas 111 and a feeding line 112. As shown in FIG. 16B, the antennas 111 are formed integrally with a one-chip EHF integrated circuit (MMIC= microwave monolithic integrated circuit) and connected to each other by means of the feeding line 112. The antenna 110 is thus integrated on a large scale. FIG. 16C is an enlarged view of the back of one patch antenna 111. In the patch antenna 111, as shown in FIG. 16C, a matching circuit 114 of a thin-film conductor and an EHF integrated circuit (MMIC) 115 are formed between the feeding line 112 and a feeding point 113 on a substrate. FIG. 16D is an enlarged view of the EHF integrated circuit (MMIC) 115.

If the above EHF array antenna 110 is driven by the control circuit section 60 built in the antenna unit 6 shown in FIG. 6 based on the operating principle similar to the beam steering function shown in FIGS. 15A and 15B, an antenna beam 116 having a fan-shaped section is swept at high speed, as will be described later. Consequently, a target such as a car ahead of a user and an obstruction, can exactly be detected.

Figure 17A:
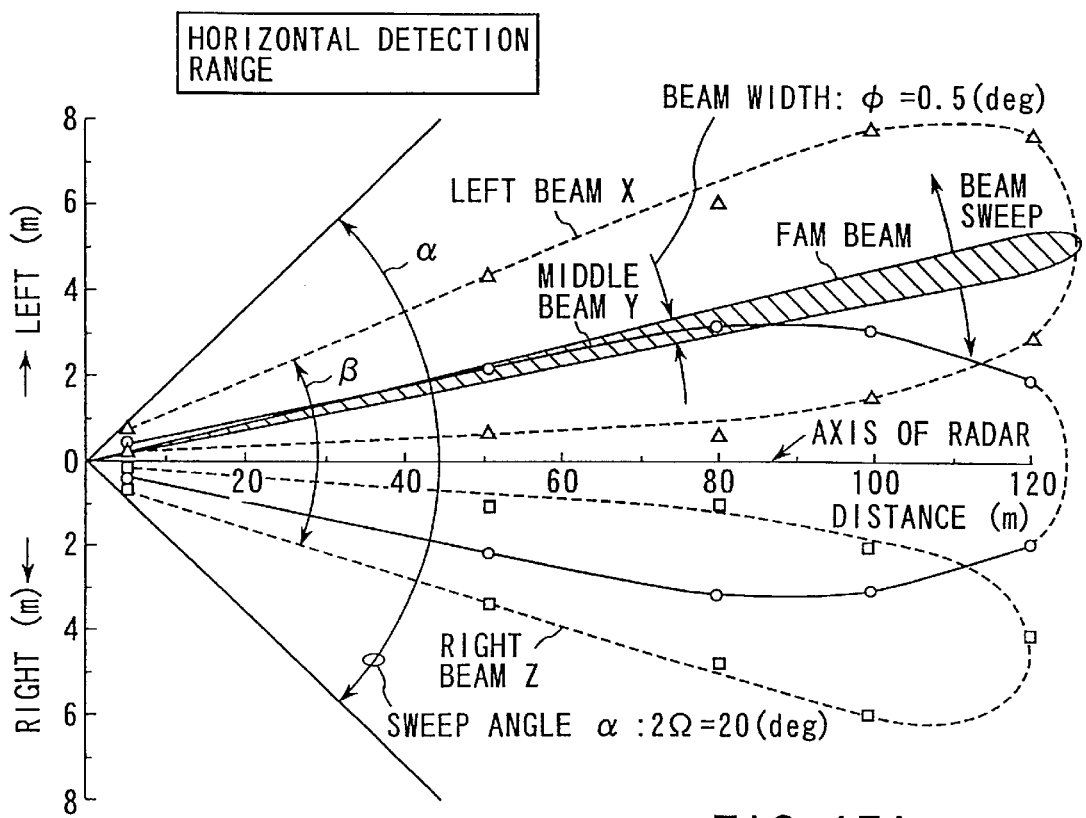
FIGS. 17A and 17B are illustrations showing a combination of a detection range of the anti-collision EHF radar shown in FIGS. 16A to 16D with that of a conventional multibeam radar.
Figure 17B:
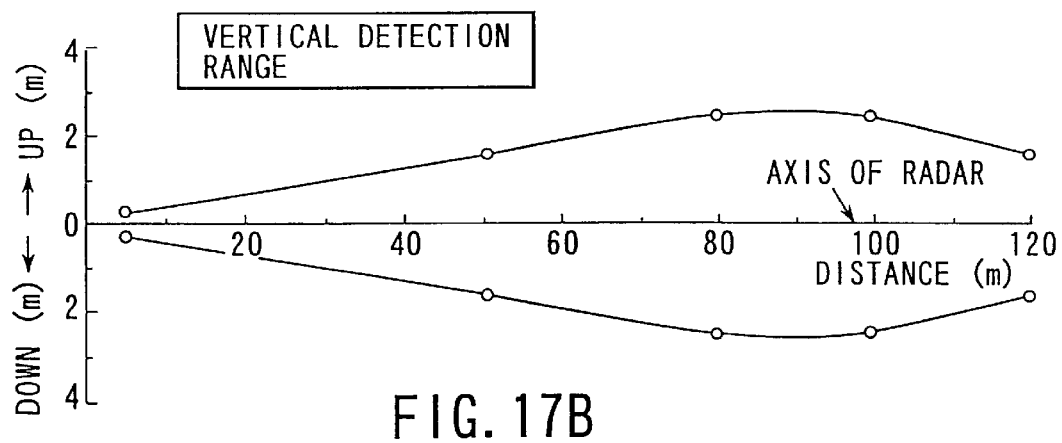

FIGS. 17A and 17B are diagrams showing a comparison between a detection range of the anti-collision EHF radar (beam-sweep radar) 8 and that of a prior art multi-beam (three beams X, Y and Z) radar. It is apparent from FIG. 17A that the horizontal detection range (sweep angle a) of the radar 8 is considerably larger than that (divergence angle β of right and left beams) of the prior art multi-beam radar.

Figure 18:
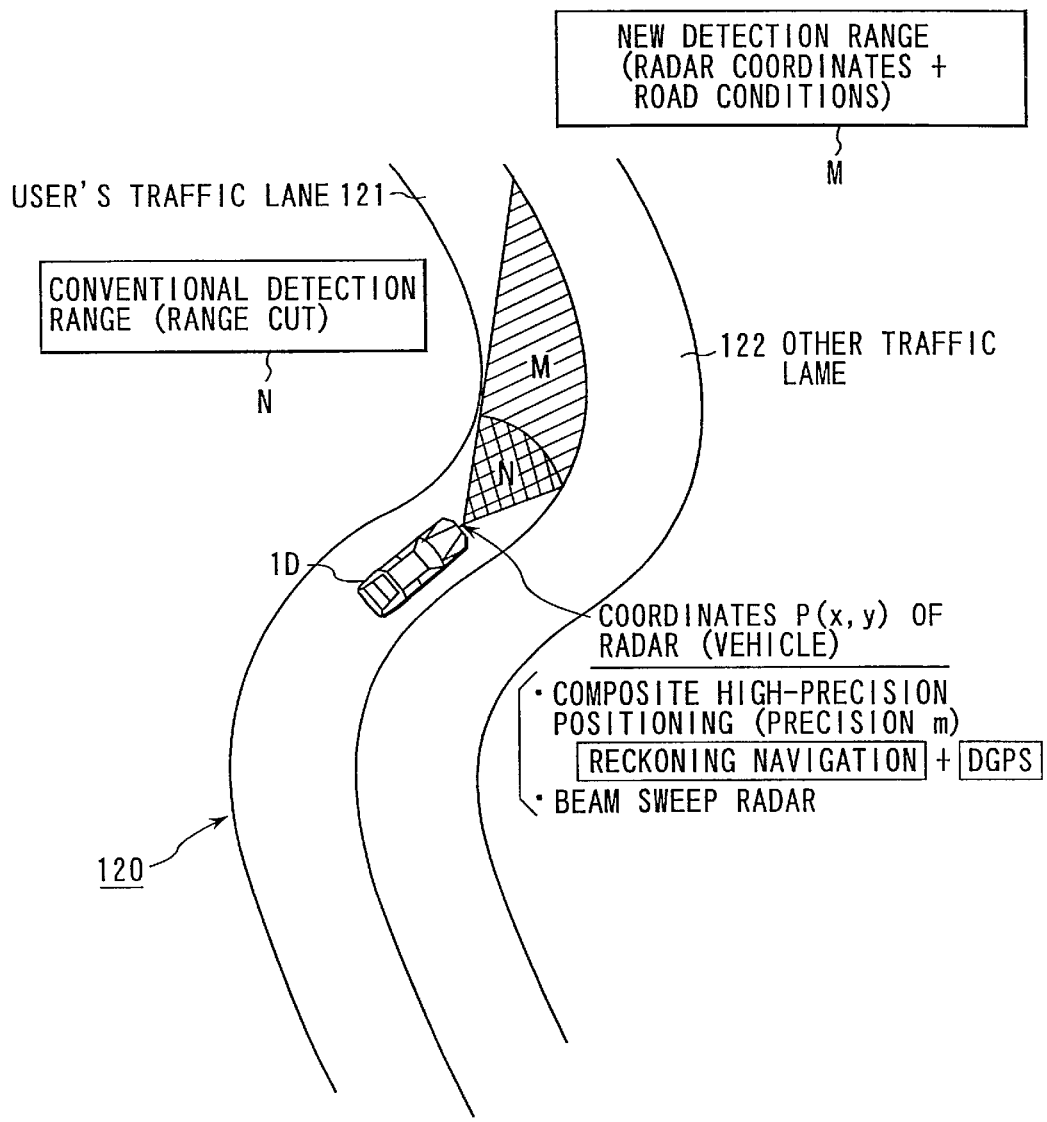
FIG. 18 is an illustration showing a combination of detection performance of the anti-collision EHF radar in the automobile antenna apparatus shown FIGS. 16A to 16D with that of a conventional fixed-beam radar.

FIG. 18 is a diagram showing a comparison between detection performance of the radar 8 (using a navigation system) and that of a prior art fixed-beam radar. In the radar 8, as shown in FIG. 18, the position of the automobile ID on a road 120 can correctly be detected using a composite high-precision positioning system of DGPS and dead reckoning navigation (speed sensor+optical fiber gyro+map matching). Since, therefore, a target detection range M can thus be expanded to the limit in a traffic lane 121 of the automobile iD even at a curve of the road, it is increased more greatly than a fan-shaped target detection range N of the prior art fixed-beam radar. In the prior art fixed-beam radar, the maximum detection range is cut in accordance with the curvature of the curve to prevent the detection range of the traffic lane 121 from lapping over the other traffic lane 122. The target detection range N is thus remarkably restricted as shown in FIG. 18.

Figure 19:
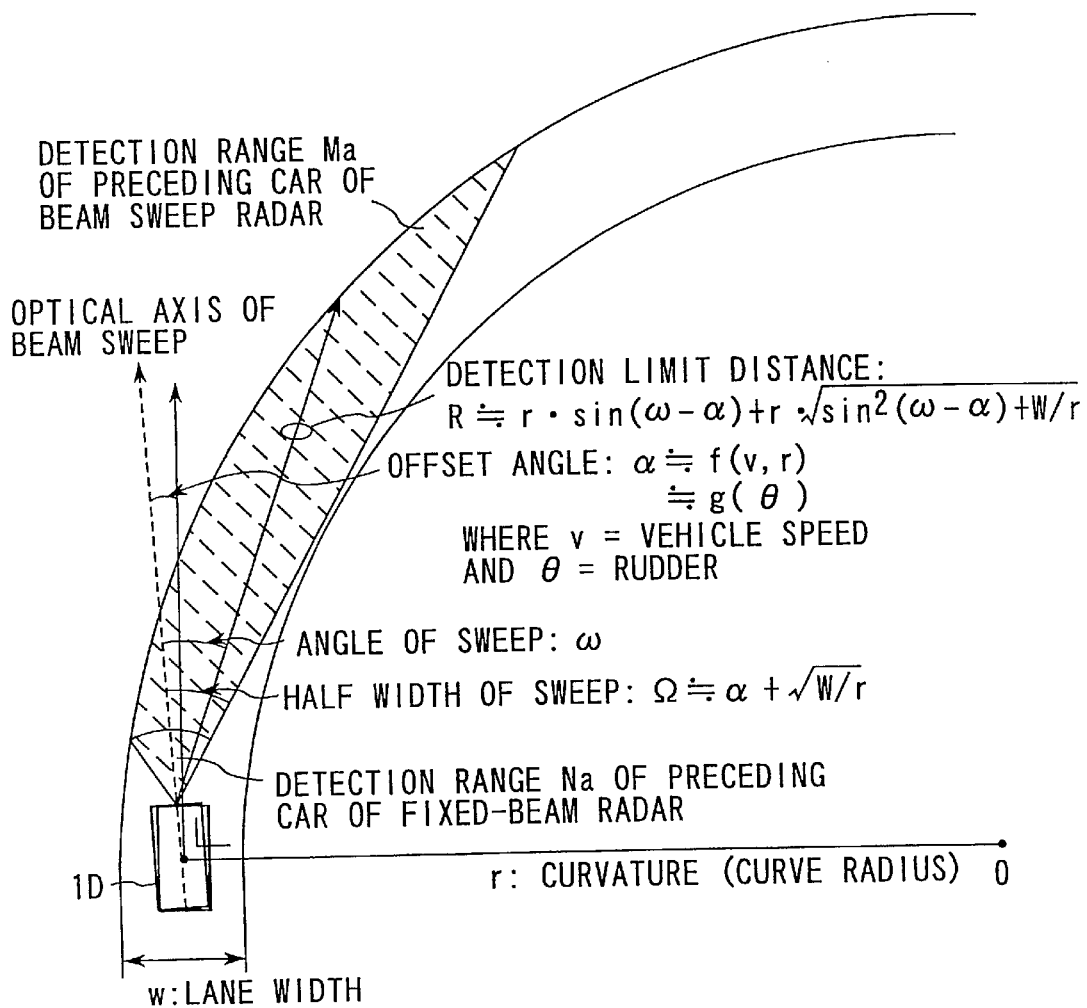
FIG. 19 is a diagram showing a combination of preceding-car detection performance of the anti-collision EHF radar of the apparatus of FIGS. 16A to 16D at a curve with that of the conventional fixed-beam radar.

FIG. 19 is a diagram showing a comparison between preceding-car detection performance at a curve in the beam-sweep radar 8 and that in the prior art fixed-beam radar. If, as shown, a fan-shaped beam-sweep angle (only the half of which is shown) ω and a detection limit range R are both controlled based on the expression given in FIG. 19, the detection range at the curve is expanded to the limit. A preceding-car detection range Ma (indicated by oblique, broken lines) is thus greatly increased. In contrast, in the prior art fixed-beam radar, the detection range is cut for the above reason, so that a preceding-car detection range Na is very decreased.

Figure 20:
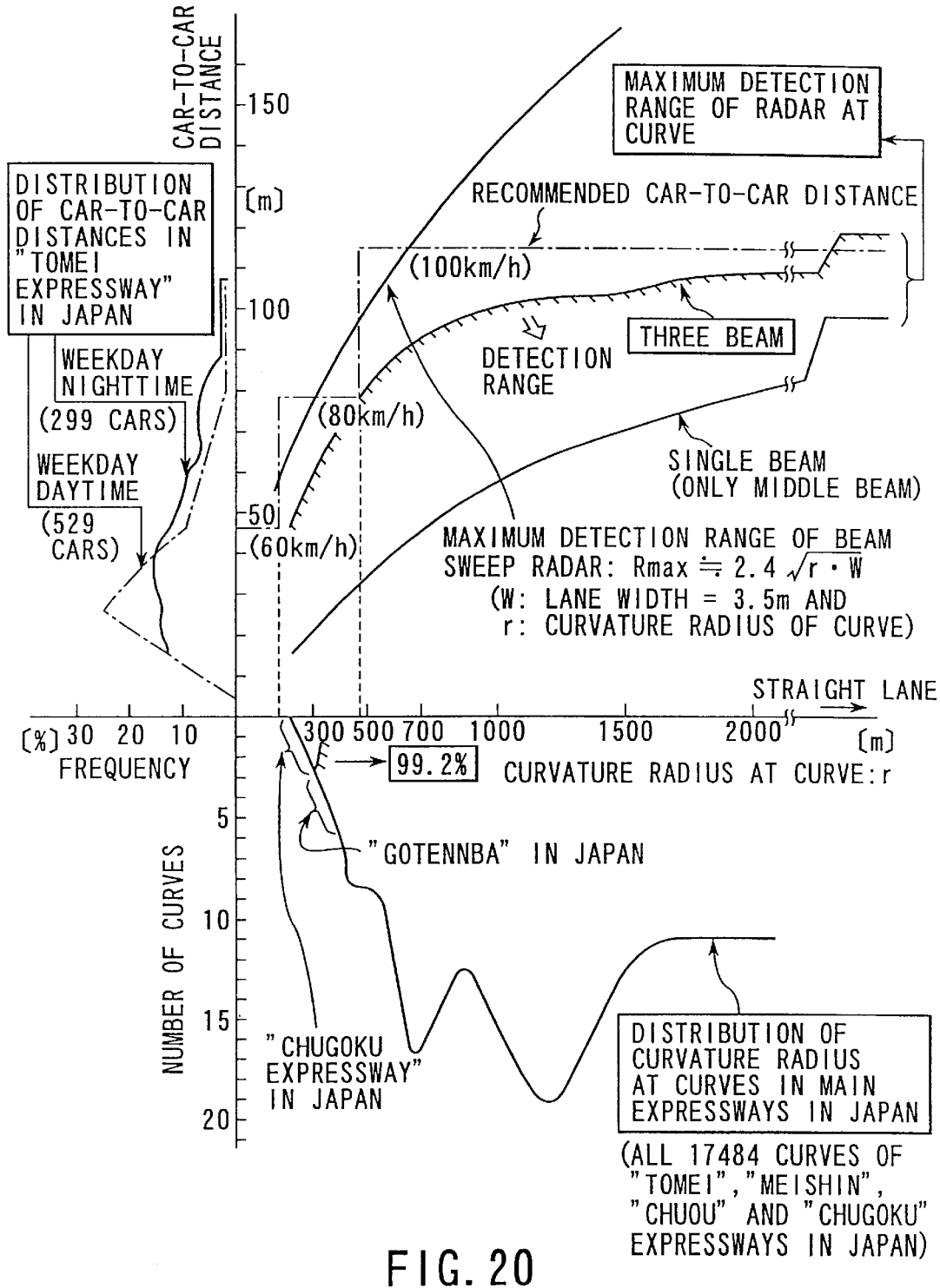
FIG. 20 is a diagram showing a combination of preceding-car maximum detection range characteristic of the anti-collision EHF radar of the apparatus of FIGS. 16A to 16D at a curve with that of the conventional single fixed-beam radar and that of the multibeam radar.

FIG. 20 is a diagram showing a comparison of a preceding-car maximum detection range characteristic at a curve in the beam-sweep radar 8 with that in the single fixed-beam radar and that in the multi-beam (three-beam) radar. As shown, the preceding-car maximum detection range Rmax of the beam-sweep radar, with respect to the curvature r of the curve, is expanded more greatly than that of the single fixed-beam radar and that of the multi-beam radar. FIG. 20 also shows data of both a recommended car-to-car distance and the distribution of car-to-car distances in "Tomei Expressway" in Japan. It is evident from the above data that the preceding-car maximum detection range Rmax of the beam-sweep radar is considerably large and the preceding-car detection performance thereof is remarkably excellent.

Figure 21:
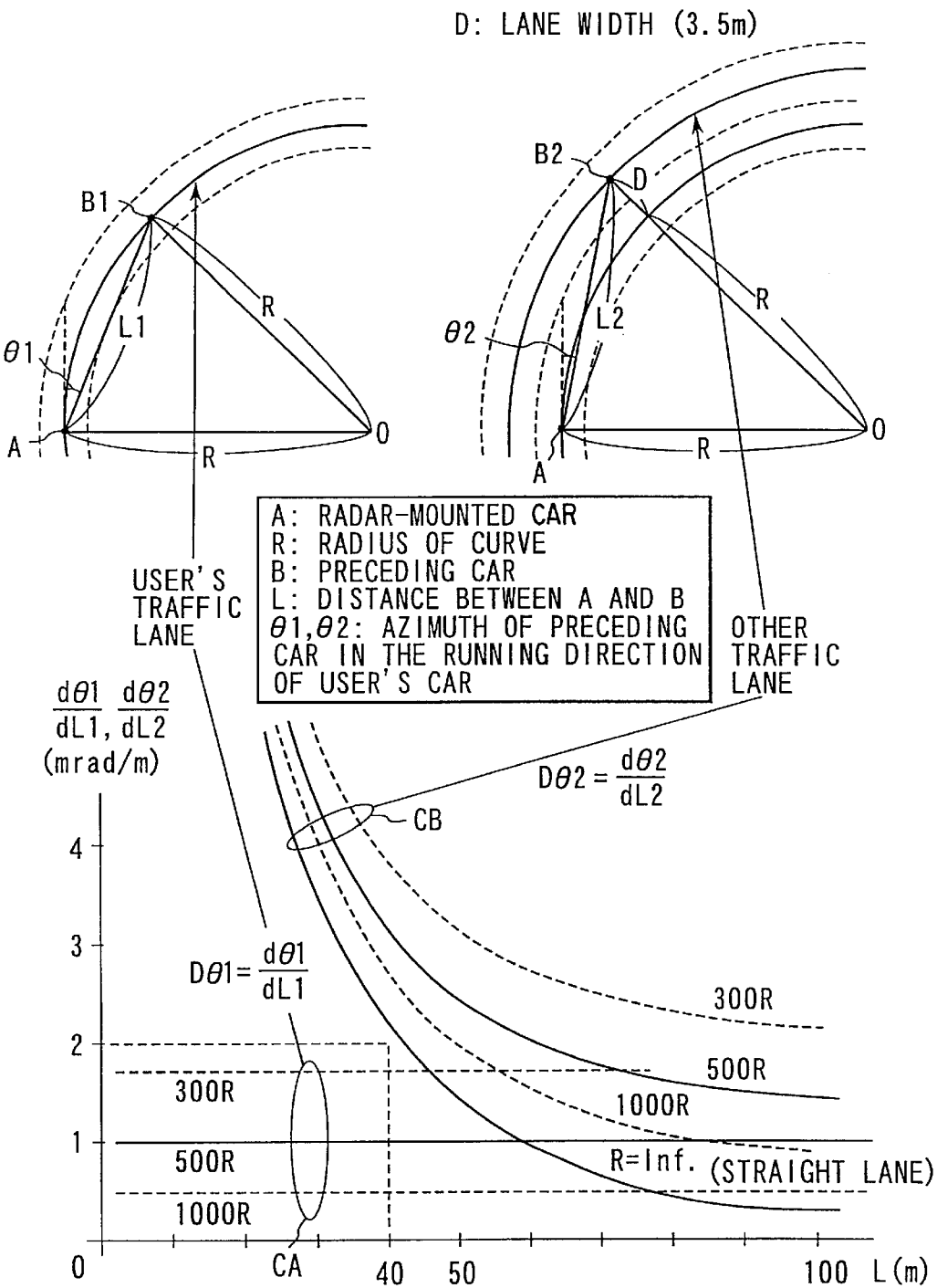
FIG. 21 is a diagram showing a preceding-car lane discrimination performance of the anti-collision EHF radar of the apparatus shown in FIGS. 16A to 16D at a curve.
Figure 22:
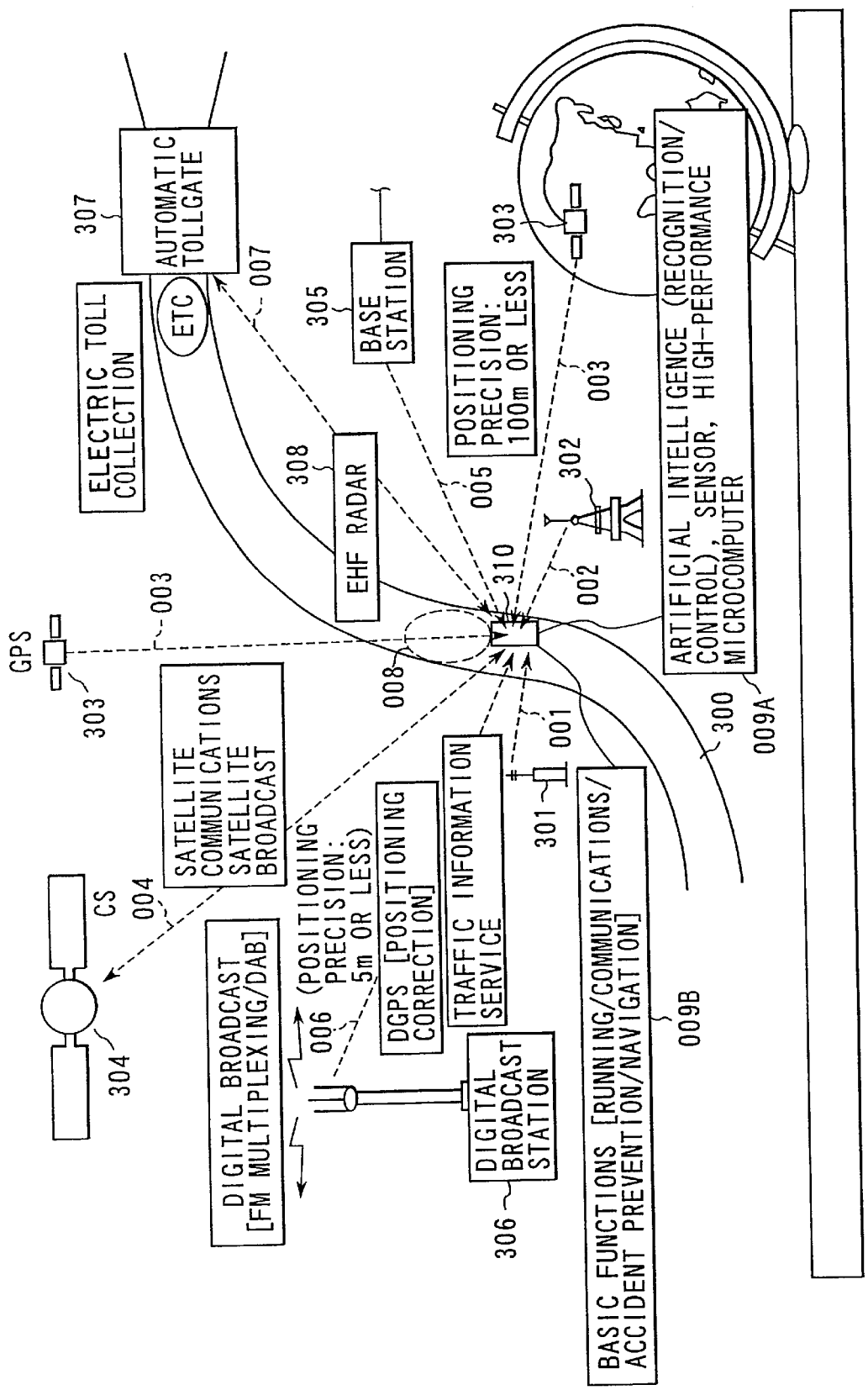
FIG. 22 is a conceptual illustration of both ITS environment which can be considered to be almost ideal at the present time and an automotive technology which is adapted to the ITS environment.
Figure 23:
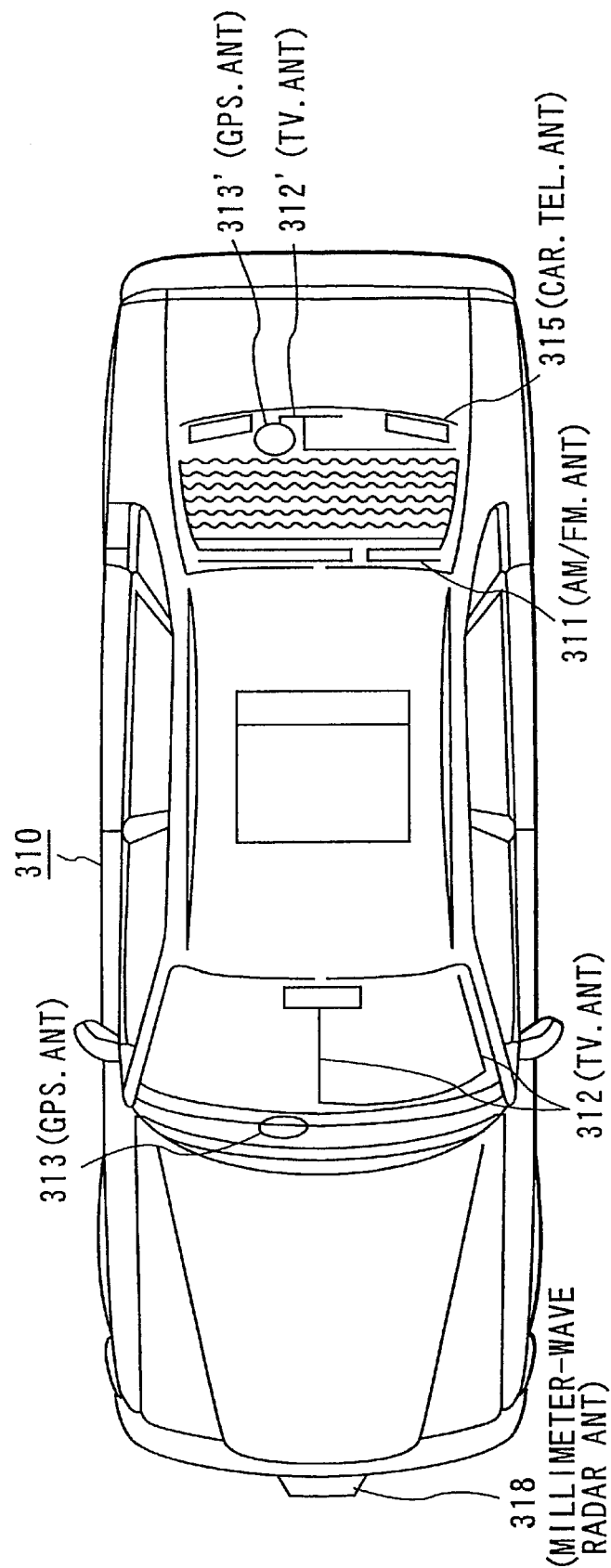
FIG. 23 is a sketch of a prior art automobile antenna apparatus having various functions.
Figure 24A:
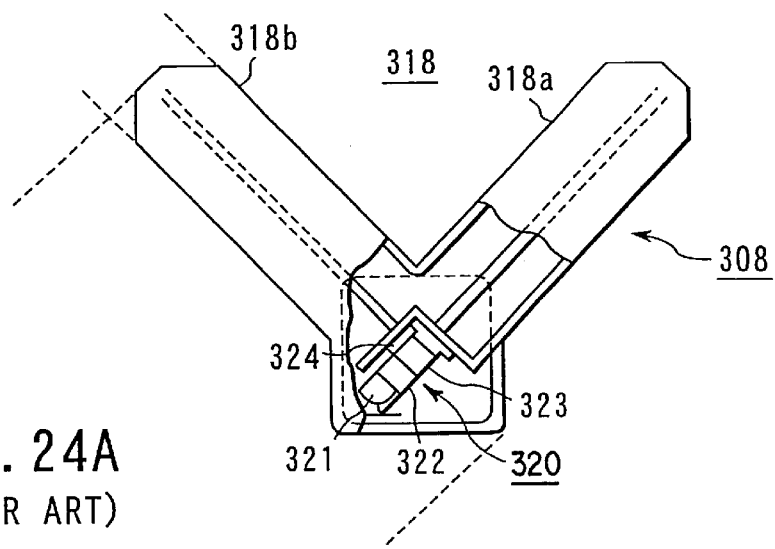
FIGS. 24A to 24C are views showing the constitution of a prior art automobile anti-collision EHF radar.
Figure 24B:
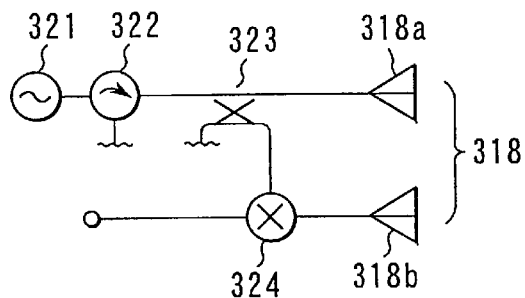
Figure 24C:
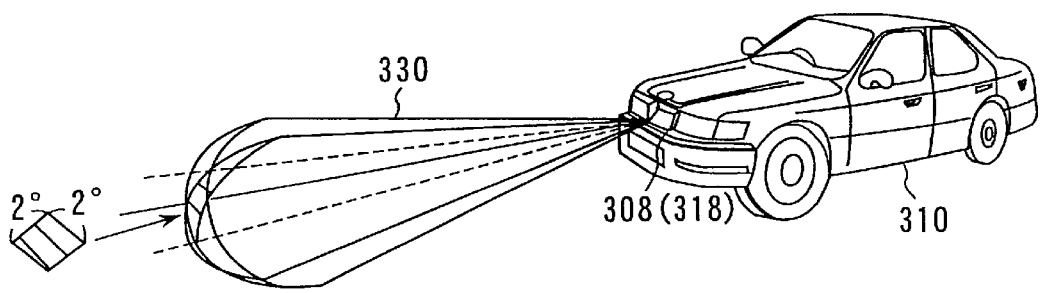

FIG. 21 is a diagram showing a preceding-car lane discrimination performance at a curve. If, as shown, the beam-sweep radar 8 is employed, it can be discriminated from the operation results (CA in the user's traffic lane and CB in the other lane) of radar detection information (angle θ of axis of the user's traffic lane of distance L/sweep angle ω) whether a preceding car is running in the user's traffic lane or the other traffic lane. In FIG. 21, A indicates the position of the user's car (radar-mounted car), B1 shows the position of the preceding car in the user's lane, 12 shows the position of the preceding car in the other lane, R is the radius of the curvature, L1 is the distance between A and B1, L2 is the distance between A and B2, θ1 is the azimuth of point B1 viewing from point A, and θ2 is the azimuth of point B2 viewing from point A. As described above, the anti-collision EHF radar 8 of the fourth embodiment has various high performance capabilities.

Features of the Embodiments

[1] An automobile antenna apparatus according to the above embodiment comprises an antenna control section including:

a first means for electronically and variably controlling (beam-steering or beam-scanning) an emitting-beam pattern of each of antennas (3, 101, 110) mounted on an automobile (1), based on high-precision positional information of the automobile (1), and a second means for optimizing a function of using an electric wave for vehicle (for broadcast wave reception, mobile communications, positioning, obstruction detection, and the like) based on the electronically and variably controlling of the emitting-beam pattern.

[2] An automobile antenna apparatus according to the above embodiment comprises a smart antenna (3), the smart antenna including:

a slot antenna (20) having a slot space as a main element, the slot space being surrounded with a first region (EA) in which a metal film covers a defogger (21) formed on a window (2) of an automobile (1A) and a second region (EB) formed of a metal portion of a car body including a window frame (22) of the automobile; and an integrated multiband antenna (30) having a plurality of antenna elements (31 to 37) of thin-film conductive pieces which are arranged such that at least some of the antenna elements are inserted into the slot space of the slot antenna (20).

[3] The automobile antenna apparatus described in the above item [2], further comprises:

a control circuit section (60) provided close to the smart antenna (3) and connected to at least part of the smart antenna (3); and an antenna unit (6) which is electronically controlled by the control circuit section (60) to make the smart antenna (3) integrated and intelligent so as to fulfill a receiving function of receiving an AM broadcast wave, an FM broadcast wave, a TV broadcast wave, and a GPS wave and a transmitting/receiving function of transmitting/receiving waves for a car phone and keyless door-lock control, broadcast waves relayed by a broadcast satellite and a communications satellite, and a wave for using an automatic toll collection system.

[4] In the automobile antenna apparatus described in the above item [3], the antenna unit (6) is connected to a reception set section (70) and a car computer network, which are both provided inside the automobile (1B), through an optical fiber LAN using an optical fiber (5) as a signal transmission line.

[5] In the automobile antenna apparatus described in the above item [4], the antenna unit (6) incorporates tuners (710, 730) separated from receiver main bodies (71, 73) of the reception set section (70).

[6] In the automobile antenna apparatus described in the above item [3], the control circuit section (60) of the antenna unit (6) includes a reception circuit (61, 62) capable of receiving at least one of the FM broadcast wave and the TV broadcast wave in a diversity reception mode.

[7] In the automobile antenna apparatus described in the above item [3], the control circuit section (60) of the antenna unit (6) includes an FM reception circuit (61) for receiving the FM broadcast wave and a TV reception circuit (62) for receiving the TV broadcast wave, and at least one of the FM reception circuit (61) and the TV reception circuit (62) is a reception circuit (100) having a beam steering function.

[8] In the automobile antenna apparatus described in the above item [3], the control circuit section (60) of the antenna unit (6) includes:

means for adding a beam steering function to at least one of an FM reception circuit (61) for receiving the FM broadcast wave and a TV reception circuit (62) for receiving the TV broadcast wave;

a DGPS engine (644), which is constituted by forming a normal GPS receiver (91) and a DGPS data link (92) for receiving differential correction data integrally with each other as one unit, for processing signals and data in accordance with predetermined algorithm to output high-precision positioning data (S5); and means for varying directivity of a beam in a desired direction by both the high-precision positioning data (S5) output from the DGPS engine (644) and the beam steering function added by the beam steering function adding means.

[9] An automobile antenna apparatus according to the above embodiment comprises an anti-collision EHF radar (8) mounted at least on a front of an automobile (1) and having a beam scanning function capable of emitting a beam (116) within a predetermined angle range.

[10] An automobile antenna apparatus according to the above embodiment comprises:

an anti-collision EHF radar (8) mounted at least on a front of an automobile (1) and having a beam scanning function capable of emitting a beam (116) within a predetermined angle range;

automobile position detection means for correctly detecting automobile position information by a composite high-precision positioning system of DGPS and dead reckoning navigation (speed sensor+optical fiber gyro+ map matching); and means for automatically setting a target detection range (M) by the automobile position information detected by the automobile position detection means and the beam scanning function of the anti-collision EHF radar (8).

[11] The automobile antenna apparatus described in the above item [8], comprises:

an anti-collision EHF radar (8) mounted at least on a front of the automobile (1A) and having a beam scanning function capable of emitting a beam (116) within a predetermined angle range;

automobile position detection means for correctly detecting automobile position information by a composite high-precision positioning system of DGPS and dead reckoning navigation (speed sensor+optical fiber gyro+ map matching); and means for automatically setting a target detection range (M) by the automobile position information detected by the automobile position detection means and the beam scanning function of the anti-collision EHF radar (8).

[12] The automobile antenna apparatus according to the above embodiment includes the above items [1] to [11] in combination.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radar apparatus comprising:

a beam-sweep type anti-collision EHF radar mounted at least on a front of an automobile and having a beam scanning component configured to emit a beam within a predetermined angle range;

automobile position detection means for correctly detecting automobile position information by a composite high-precision positioning system of DGPS and dead reckoning navigation; and means for automatically setting a target detection range by the automobile position information detected by the automobile position detection means and the beam scanning function of the anti-collision EHF radar.

2. The radar apparatus according to claim 1, wherein the anti-collision EHF radar includes an EHF array antenna integrated on a large scale by connecting a number of active patch antennas by means of a feeding line, the active patch antennas being formed integrally with a one-chip EHF integrated circuit.

3. The radar apparatus according to claim 1, wherein the dead reckoning navigation uses an information processing system including at least a speed sensor, an optical fiber gyro, and a map matching means.

* * * * *